US011612809B2

(12) United States Patent
Nakamura et al.

(10) Patent No.: US 11,612,809 B2
(45) Date of Patent: Mar. 28, 2023

(54) INPUT INTERFACE SYSTEM AND LOCATION-BASED GAME SYSTEM

(71) Applicant: DWANGO Co., Ltd., Tokyo (JP)

(72) Inventors: Kouichi Nakamura, Tokyo (JP); Kazuya Asano, Tokyo (JP)

(73) Assignee: DWANGO CO., LTD.

( * ) Notice: Subject to any disclaimer, the term of this patent is extended or adjusted under 35 U.S.C. 154(b) by 330 days.

(21) Appl. No.: 16/760,649

(22) PCT Filed: Oct. 31, 2018

(86) PCT No.: PCT/JP2018/040521
§ 371 (c)(1),
(2) Date: Apr. 30, 2020

(87) PCT Pub. No.: WO2019/088172
PCT Pub. Date: May 9, 2019

(65) Prior Publication Data
US 2020/0324196 A1    Oct. 15, 2020

(30) Foreign Application Priority Data

Oct. 31, 2017  (JP) .............................. JP2017-210583

(51) Int. Cl.
*A63F 13/216* (2014.01)
*A63F 13/65* (2014.01)
(Continued)

(52) U.S. Cl.
CPC ........ *A63F 13/216* (2014.09); *A63F 13/2145* (2014.09); *A63F 13/45* (2014.09);
(Continued)

(58) Field of Classification Search
None
See application file for complete search history.

(56) References Cited

U.S. PATENT DOCUMENTS

2005/0164794 A1    7/2005   Tahara
2010/0255905 A1   10/2010   Yuan
(Continued)

FOREIGN PATENT DOCUMENTS

CN    108601976 A    9/2018
JP    2002275956 A   9/2002
(Continued)

OTHER PUBLICATIONS

PCT/JP2018/040521 International Search Report and Written Opinion dated Jan. 29, 2019, 11 pgs.

*Primary Examiner* — Damon J Pierce
(74) *Attorney, Agent, or Firm* — Bracewell LLP; Doug F. Stewart; Patrick J. Connolly

(57) ABSTRACT

An input interface system for a game wherein the game progresses in the virtual world based on points that are applied corresponding to the distance of travel of a user in the real world, and event processes that are generated accompanying travel of the user are carried out sequentially, comprising: inputting means for receiving an input of a user operation in respect to a virtual object that appears in an event process, and event execution processing means for progressing the game by defining that an event process has been performed when a user operation is inputted correctly into the inputting means, wherein: the user operation is a path inputting operation wherein a path is drawn on a touch screen, and the event execution processing means perform an event process based on the shape of the path that was drawn in the path inputting operation and on the relative positioning with a virtual object

18 Claims, 20 Drawing Sheets

(51) Int. Cl.
*A63F 13/2145* (2014.01)
*A63F 13/45* (2014.01)
*A63F 13/5375* (2014.01)
*A63F 13/56* (2014.01)
*G06F 3/04883* (2022.01)

(52) U.S. Cl.
CPC .......... *A63F 13/5375* (2014.09); *A63F 13/56* (2014.09); *A63F 13/65* (2014.09); *G06F 3/04883* (2013.01); *A63F 2300/1075* (2013.01); *A63F 2300/6045* (2013.01); *A63F 2300/69* (2013.01)

(56) References Cited

U.S. PATENT DOCUMENTS

| | | |
|---|---|---|
| 2011/0081973 A1 | 4/2011 | Hall |
| 2012/0094770 A1 | 4/2012 | Hall |
| 2014/0243087 A1 | 8/2014 | Hong et al. |

FOREIGN PATENT DOCUMENTS

| | | |
|---|---|---|
| JP | 2005211242 A | 8/2005 |
| JP | 2006175059 A | 7/2006 |
| JP | 2016209110 A | 12/2016 |
| JP | 6075489 B1 | 2/2017 |
| JP | 2017170019 A | 9/2017 |
| JP | 6279135 B1 | 2/2018 |
| WO | 2013097463 A1 | 7/2013 |
| WO | 2017090272 A1 | 6/2017 |
| WO | 2017090273 A1 | 6/2017 |
| WO | 2017163702 A1 | 9/2017 |

[FIG. 1]
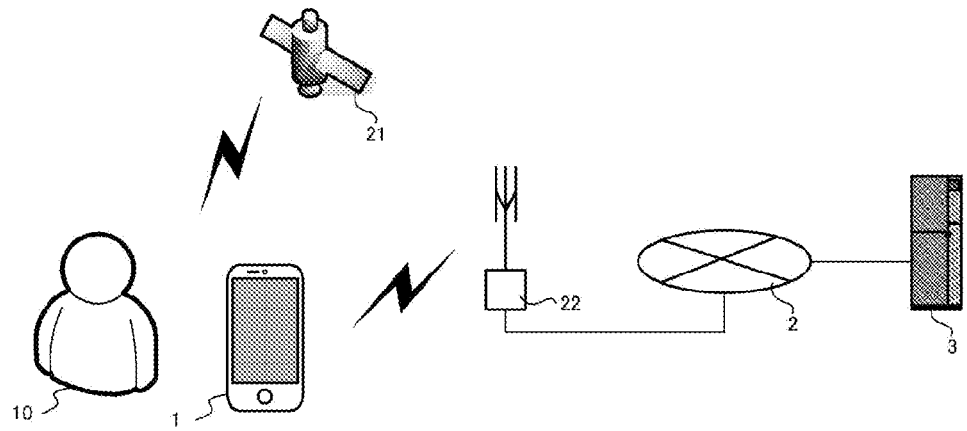
[FIG. 2]
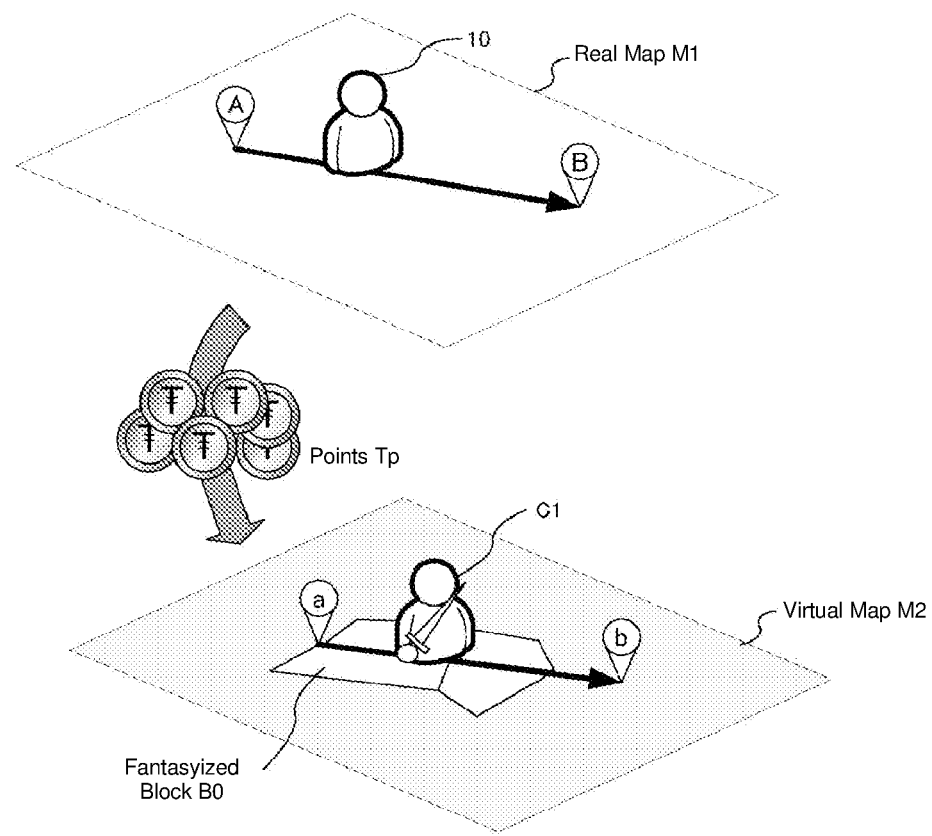

[FIG. 3]
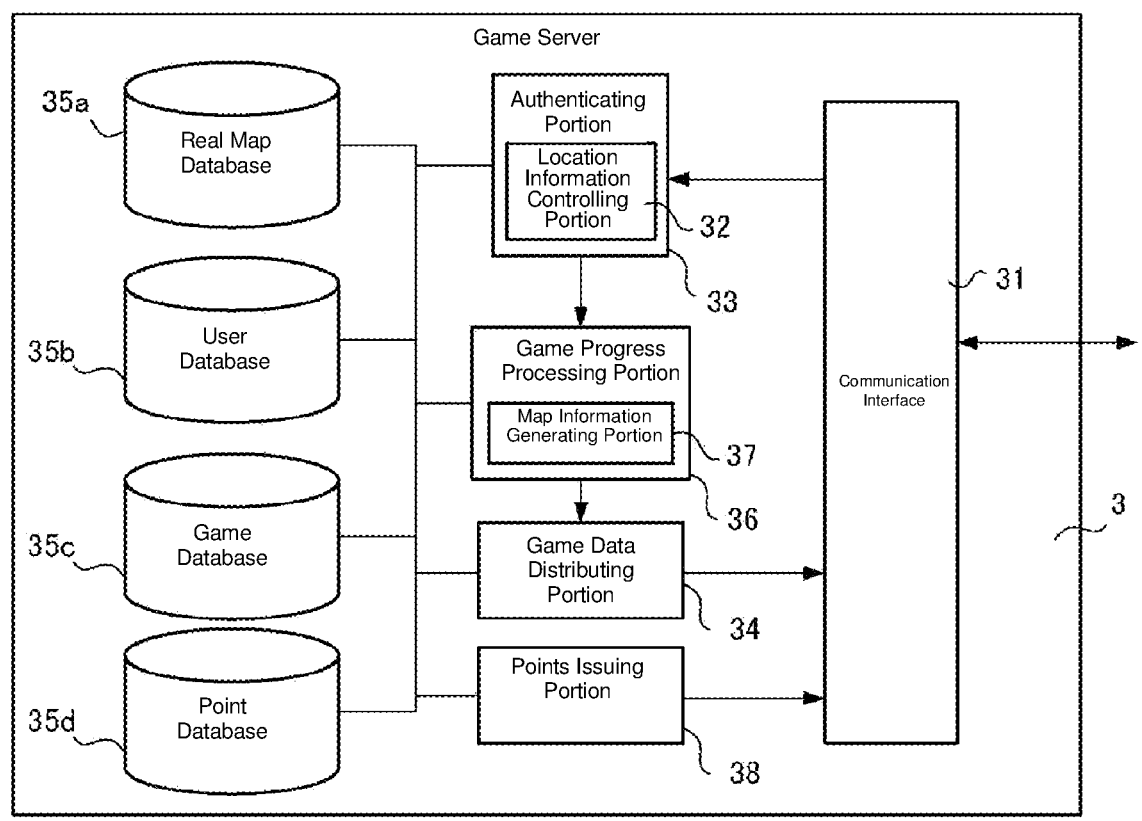

[FIG. 4]
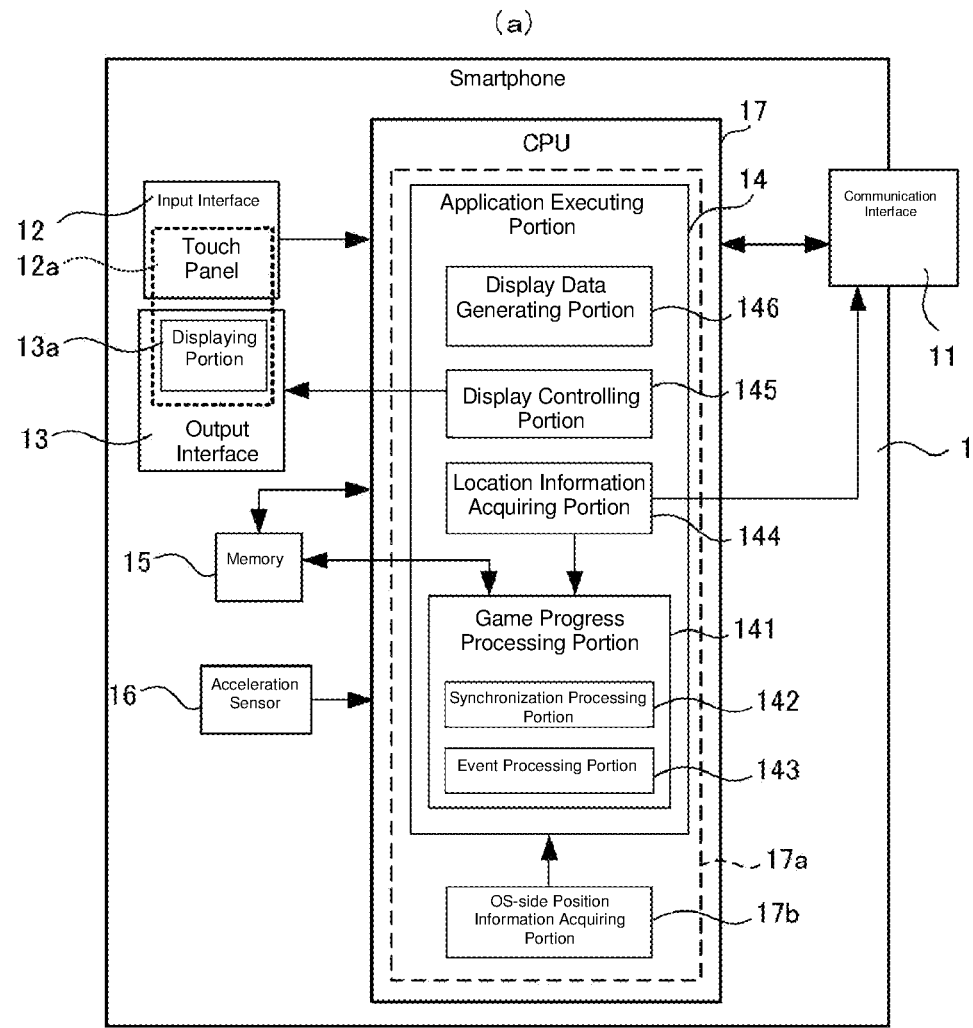
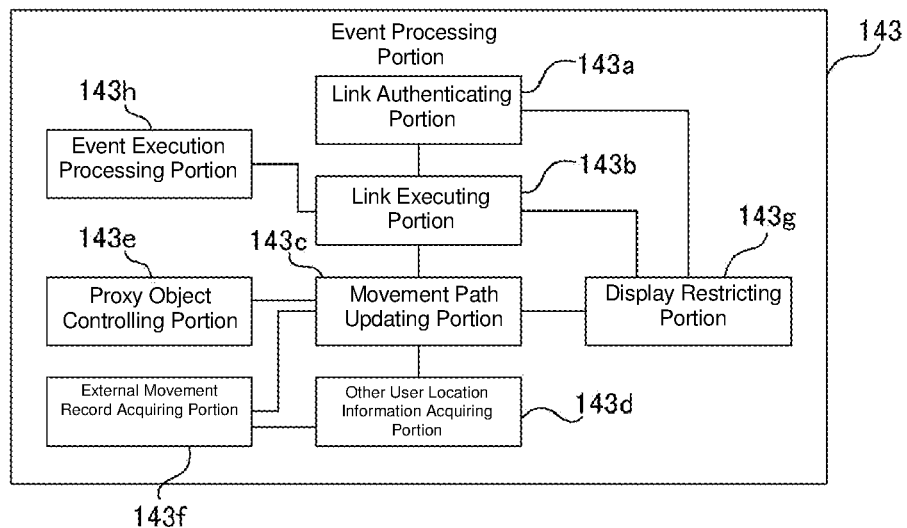

[FIG. 5]
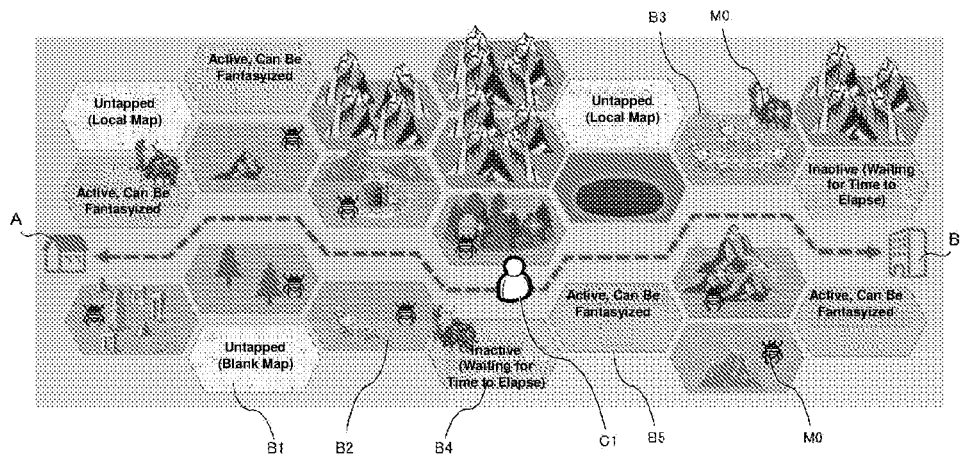
[FIG. 6]
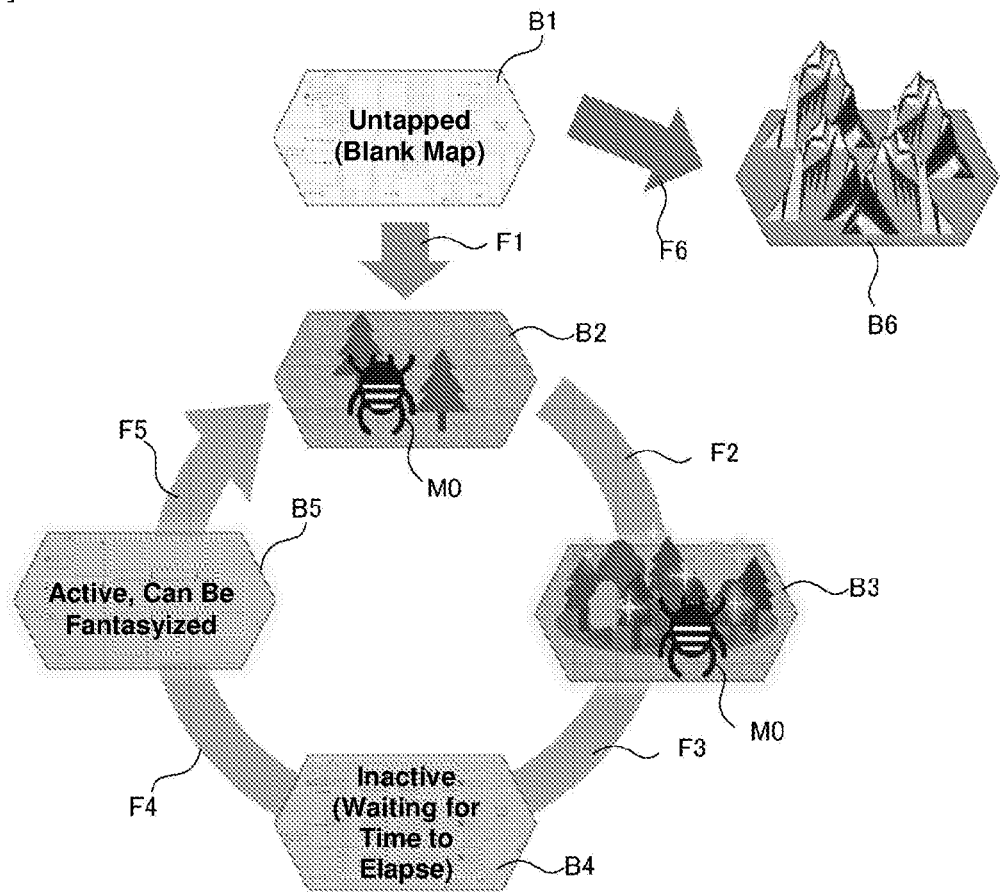

[FIG. 7]
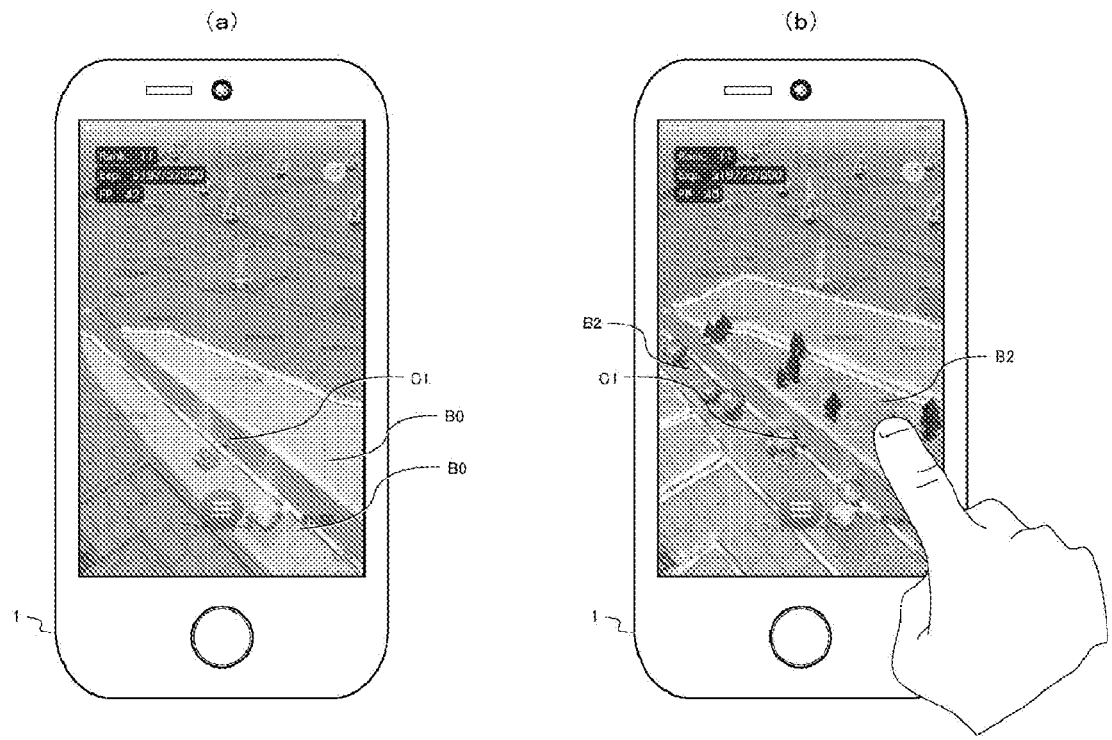
[FIG. 8]
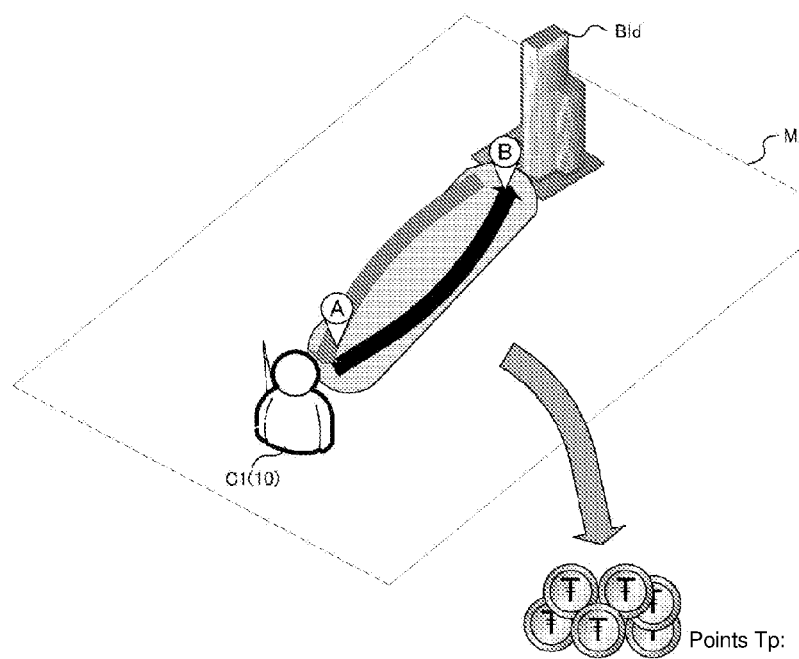

[FIG. 9]
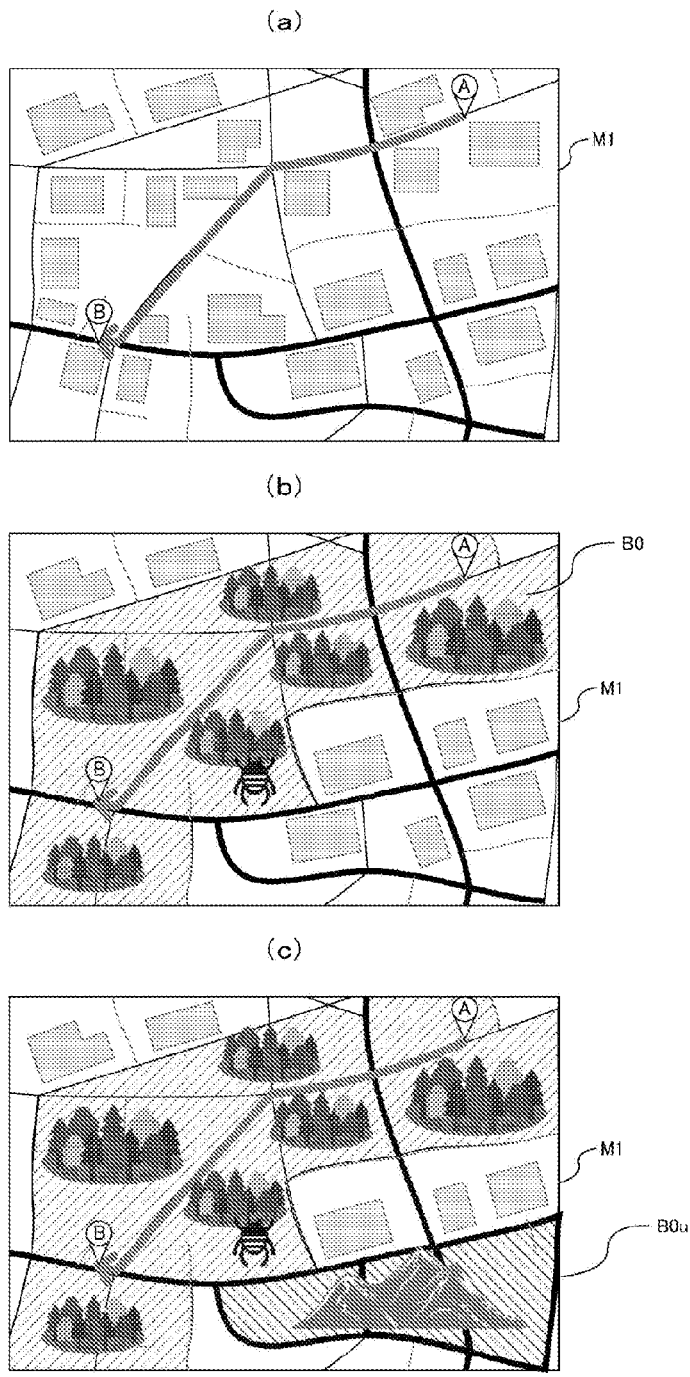

[FIG. 10]
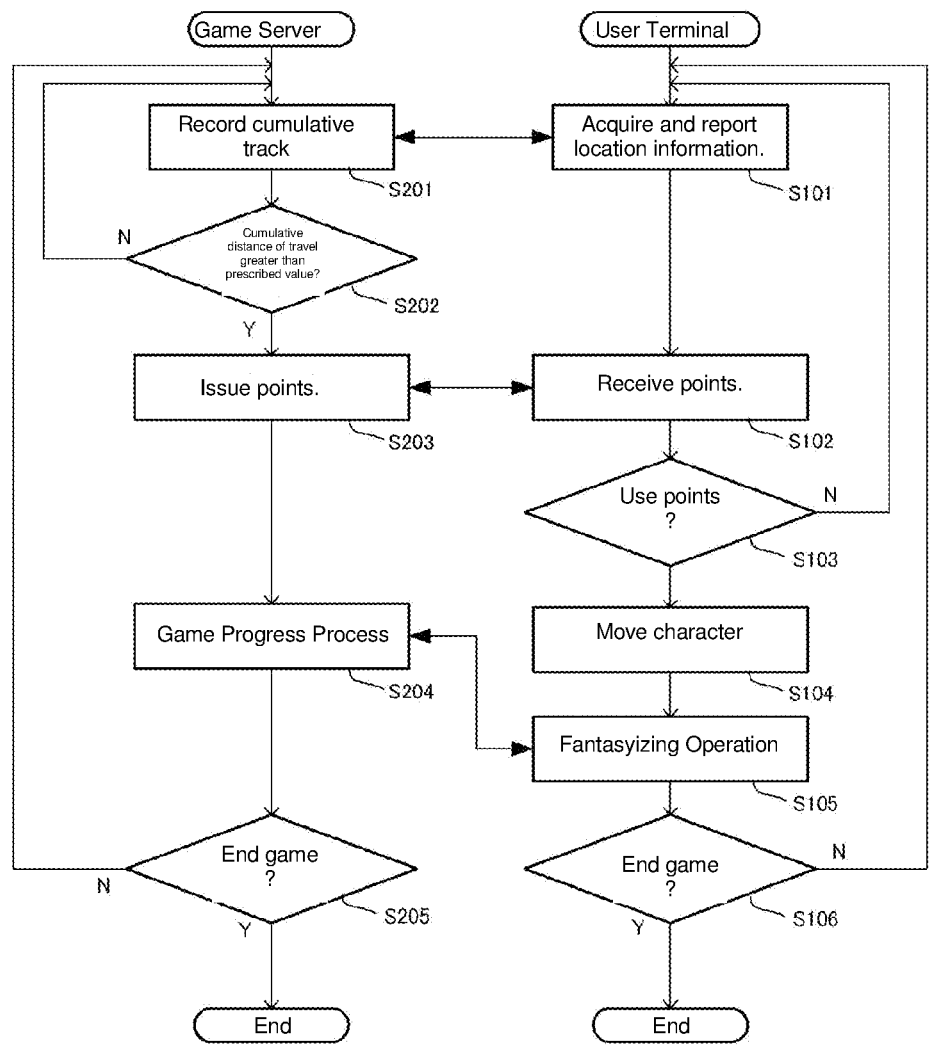

[FIG. 11]
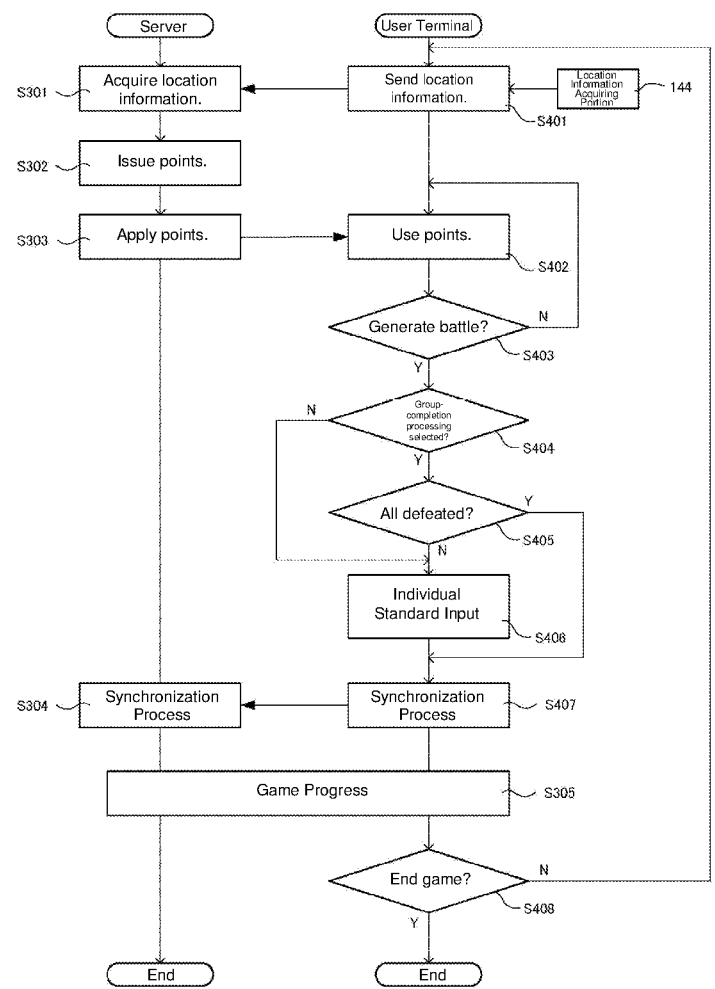

[FIG. 12]
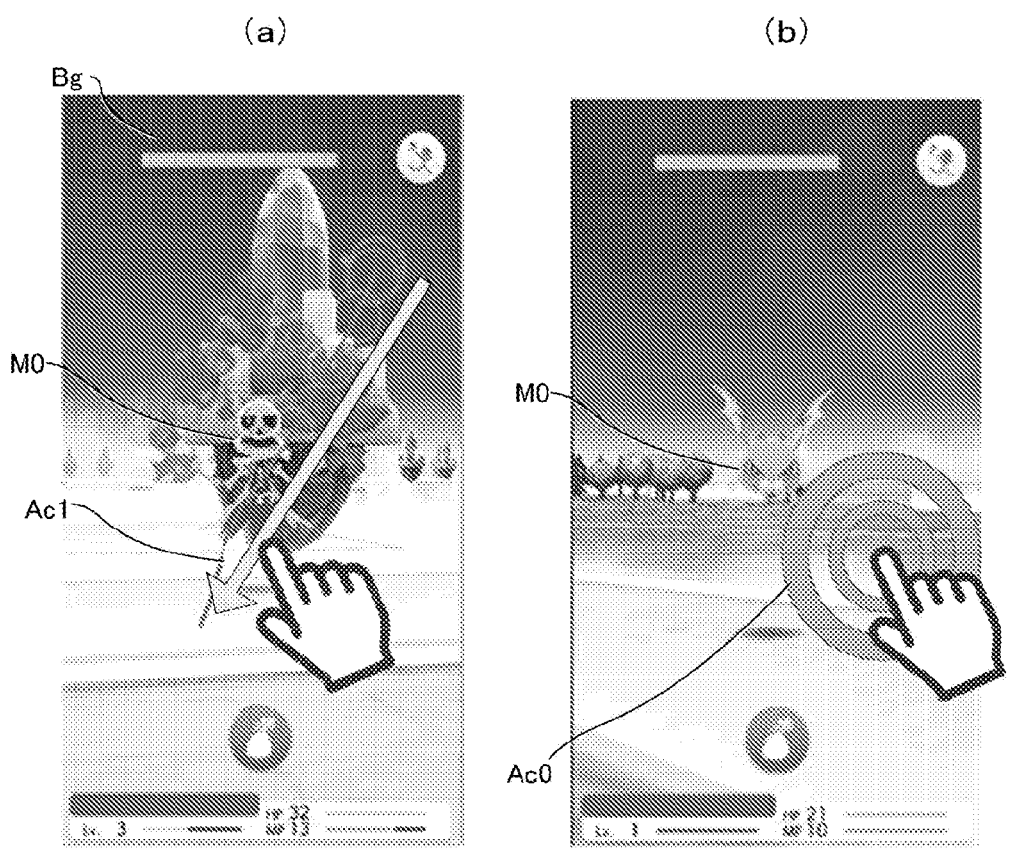

[FIG. 13]
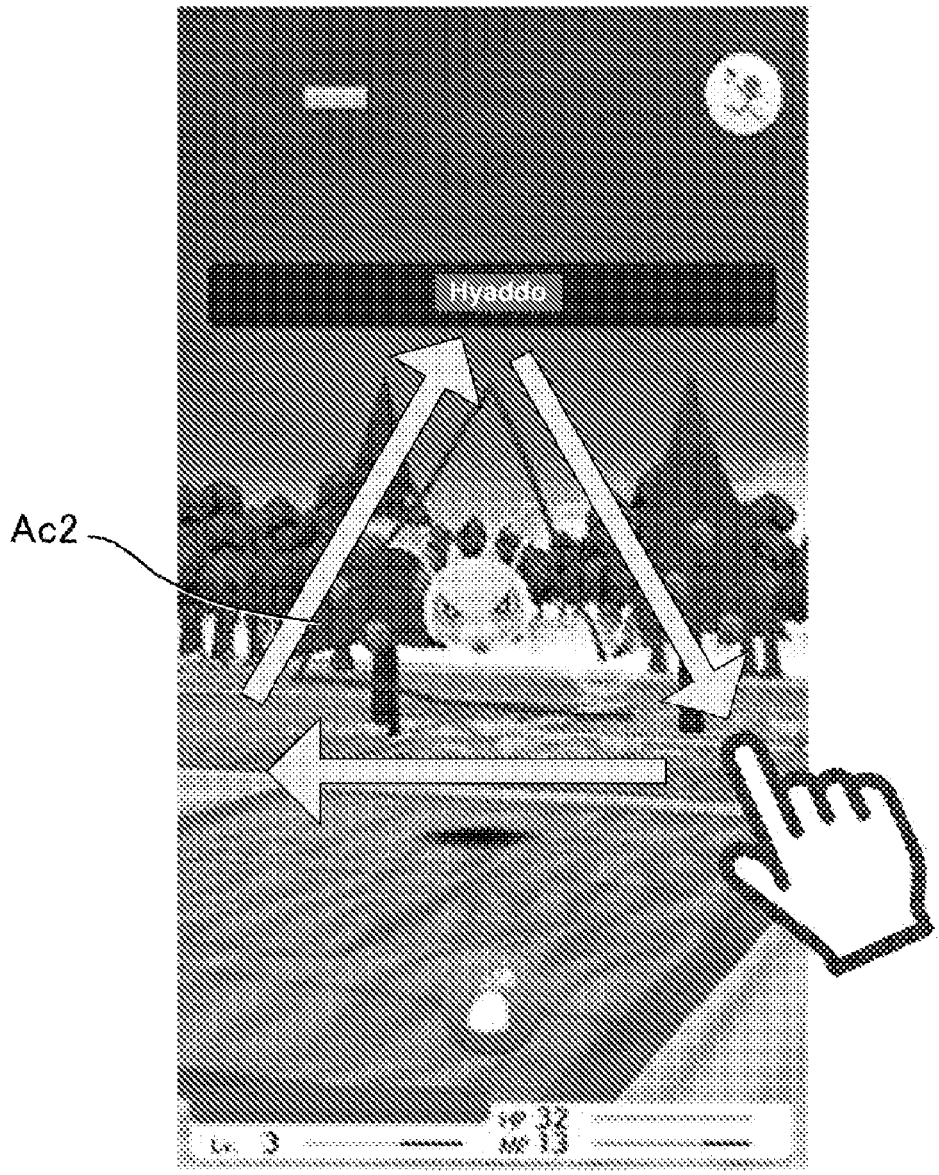

[FIG. 14]
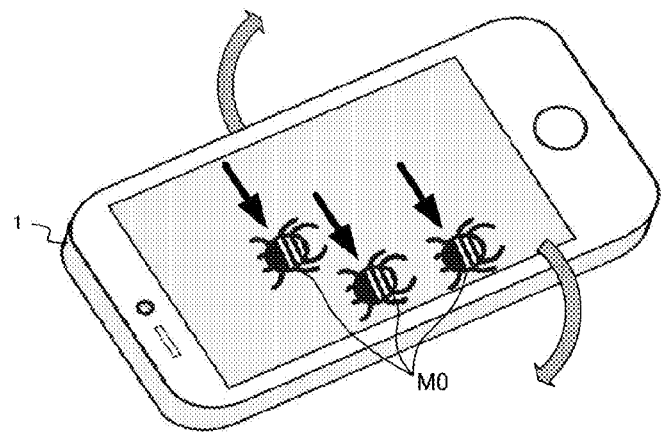
[FIG. 15]
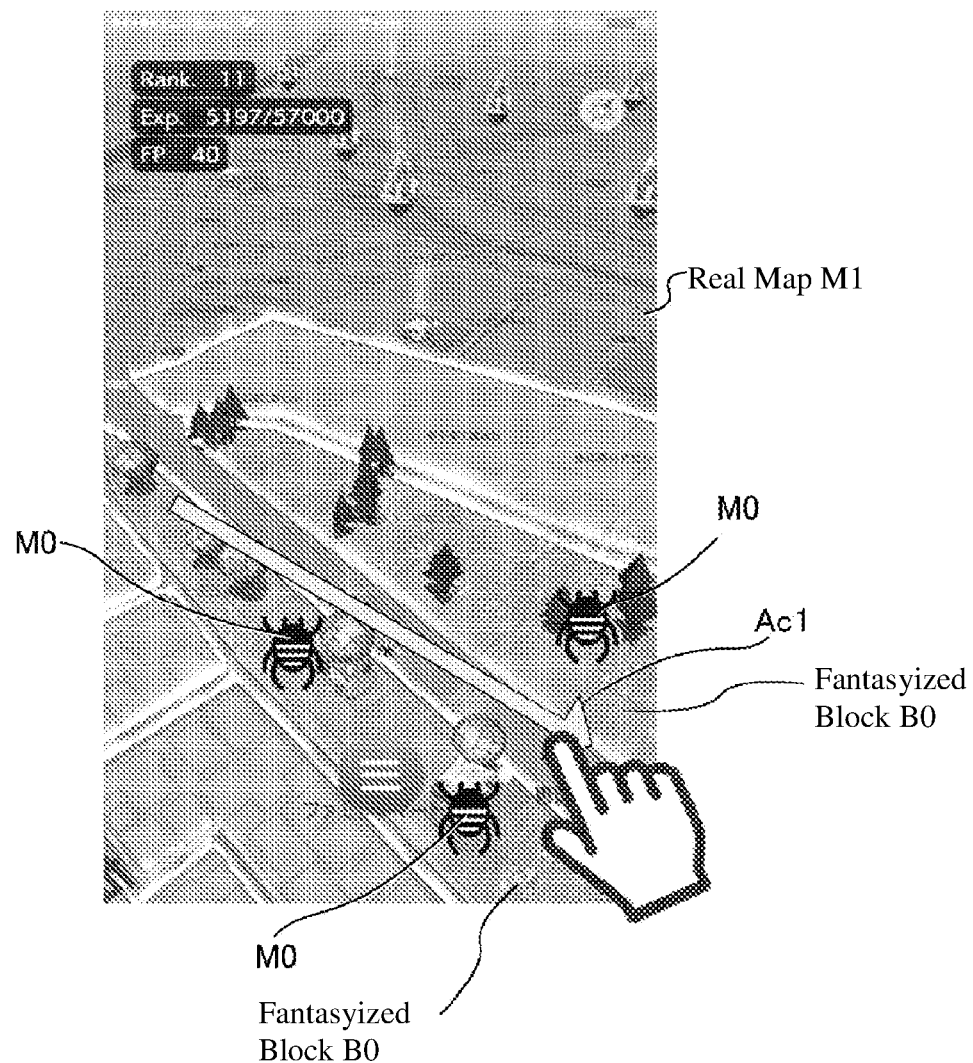

[FIG. 16]
(a)
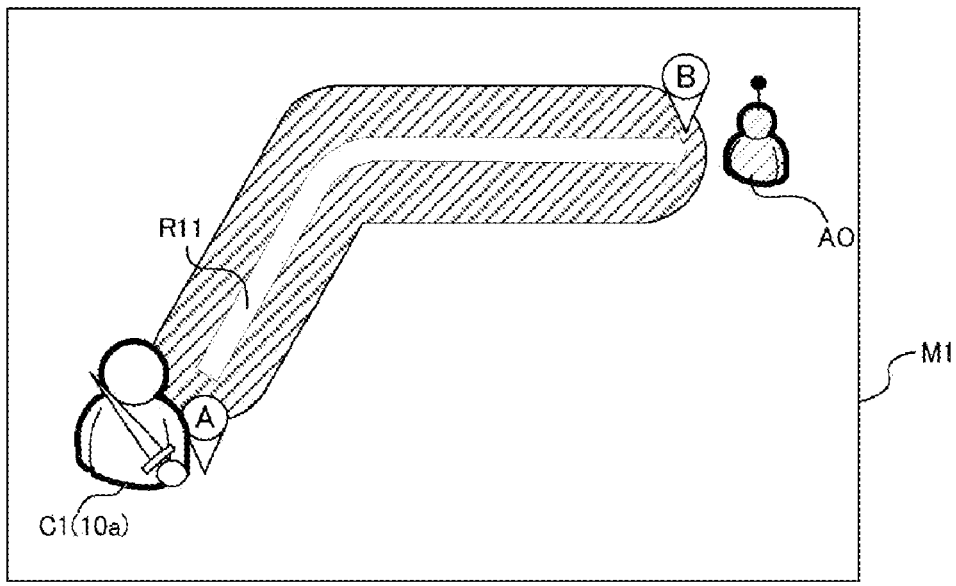
(b)
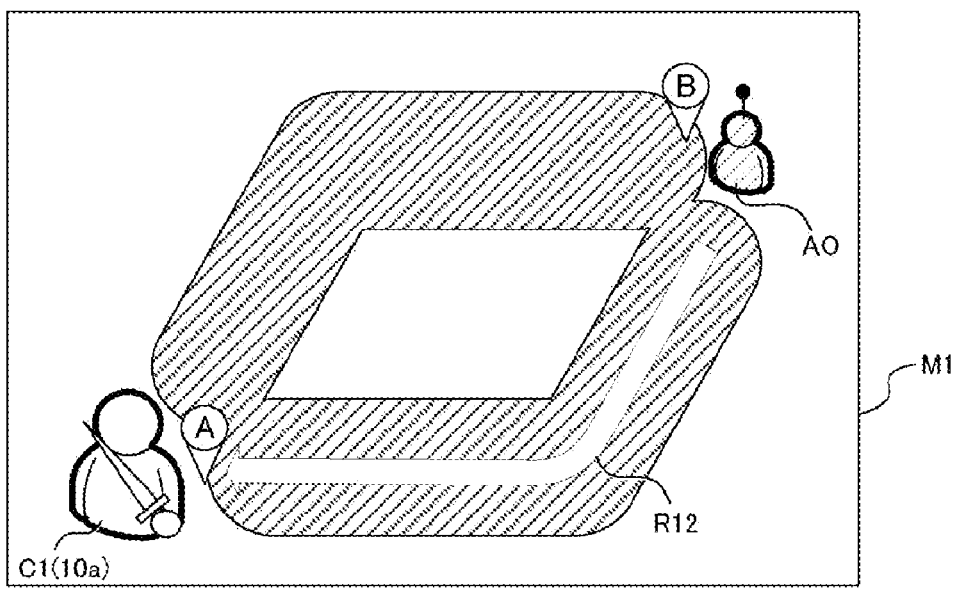

[FIG. 17]
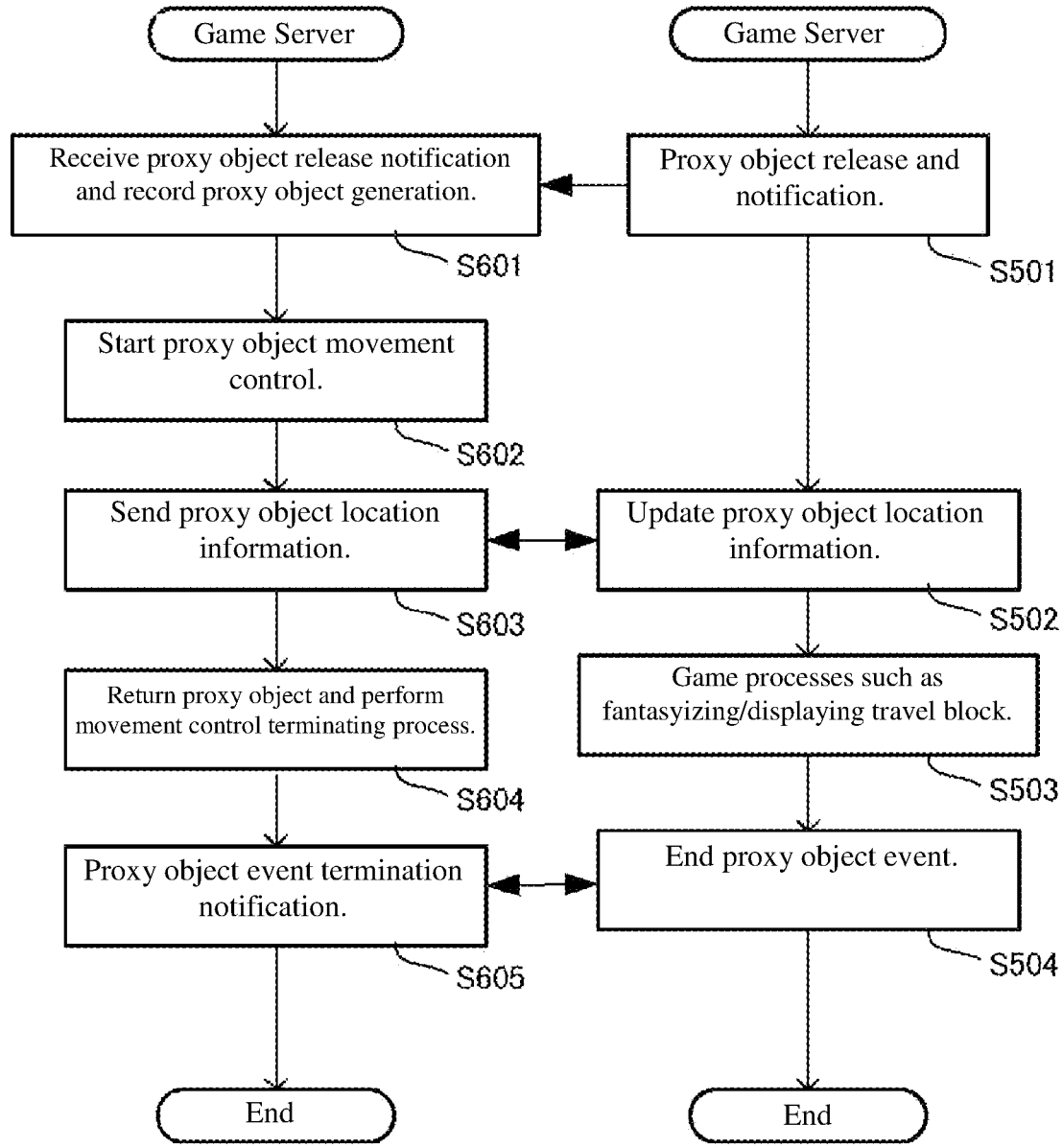

[FIG. 18]
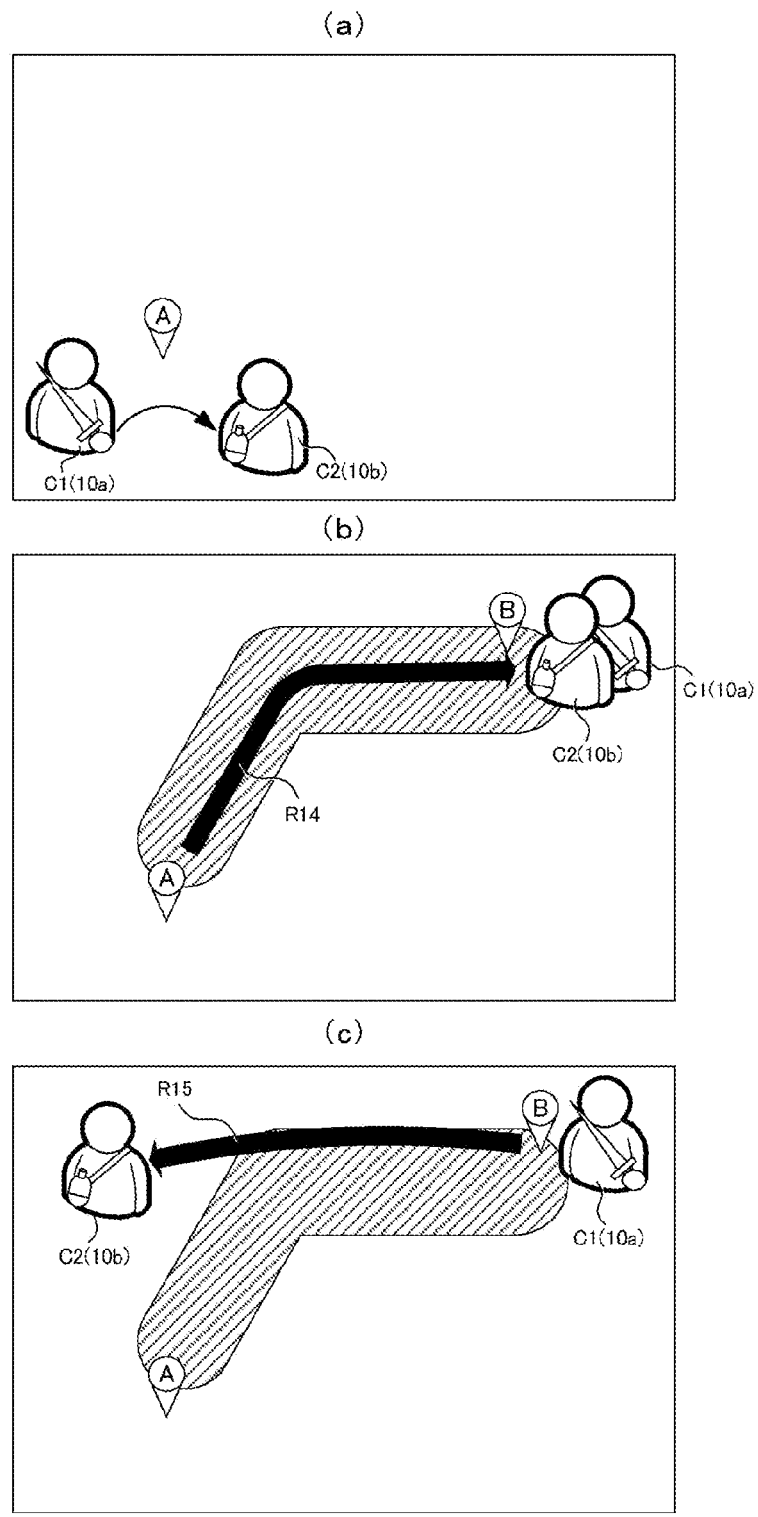

[FIG. 19]
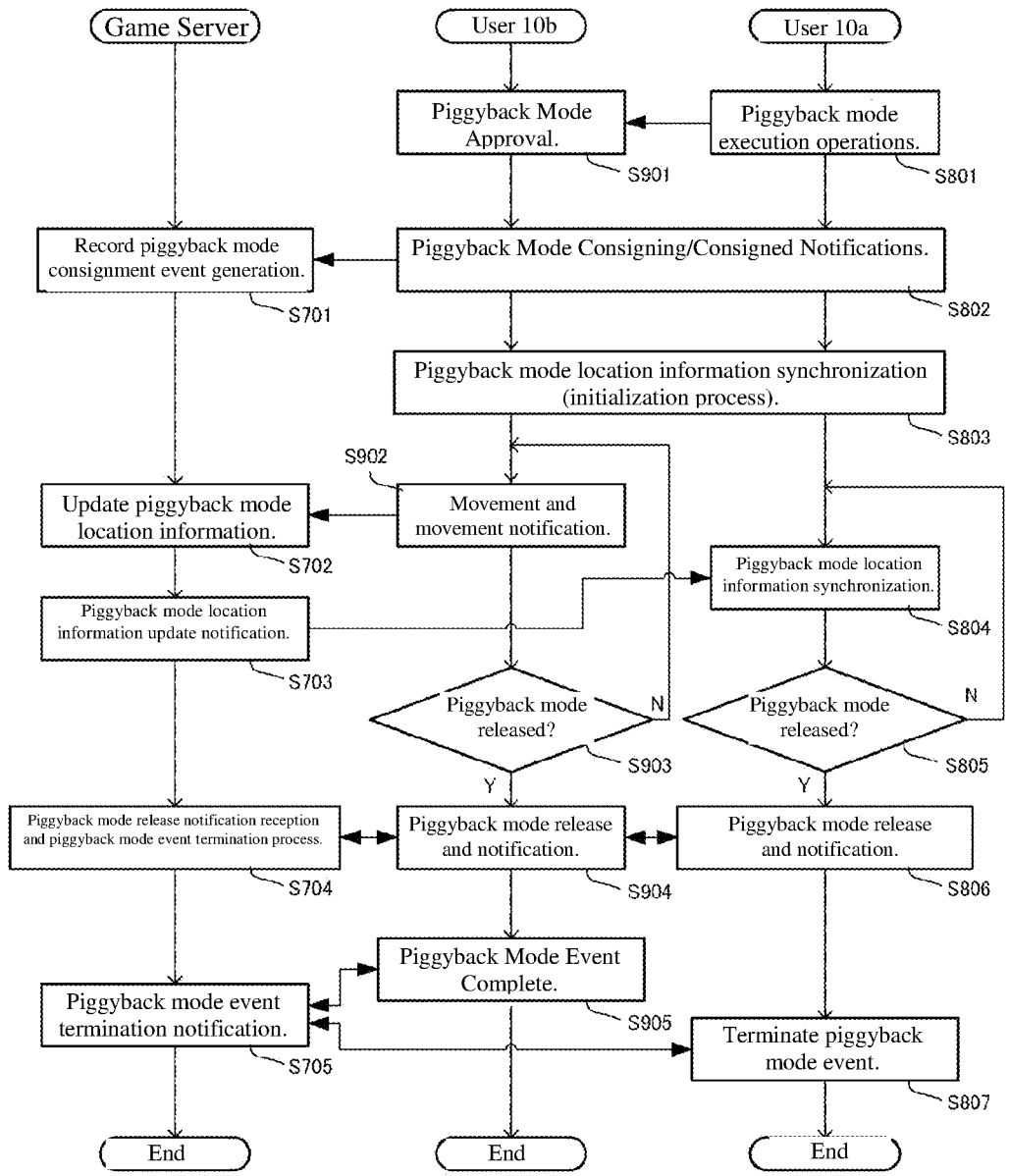

[FIG. 20]
(a)
(b)

[FIG. 21]
(a)
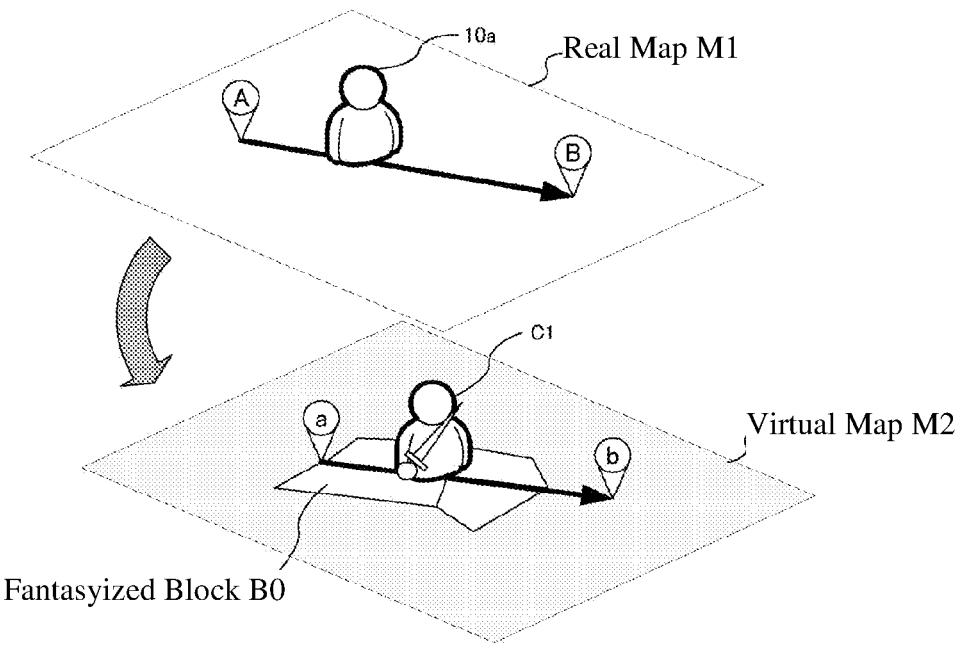
(b)
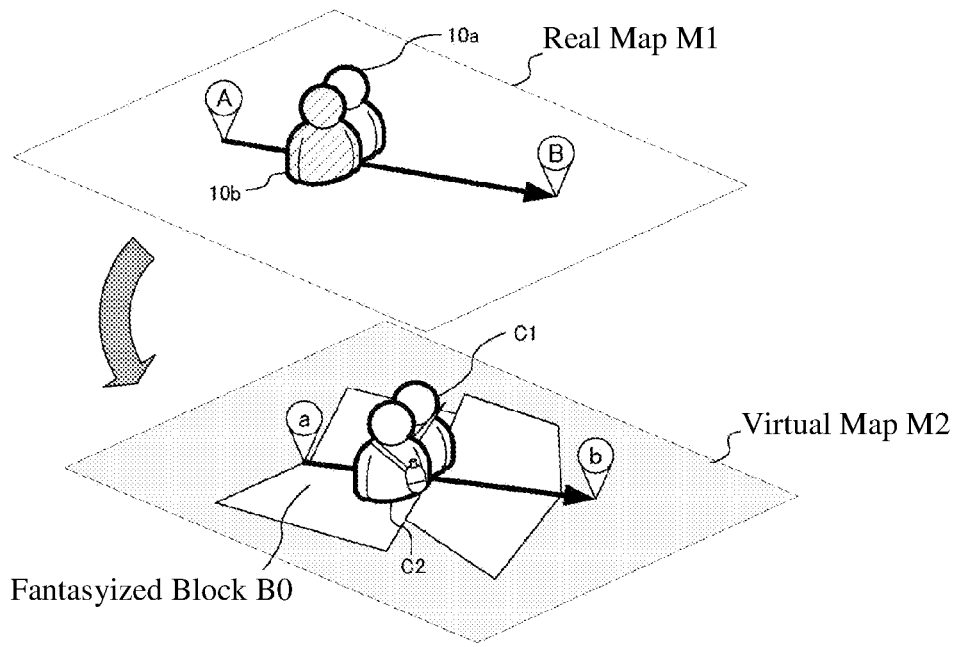

[FIG. 22]
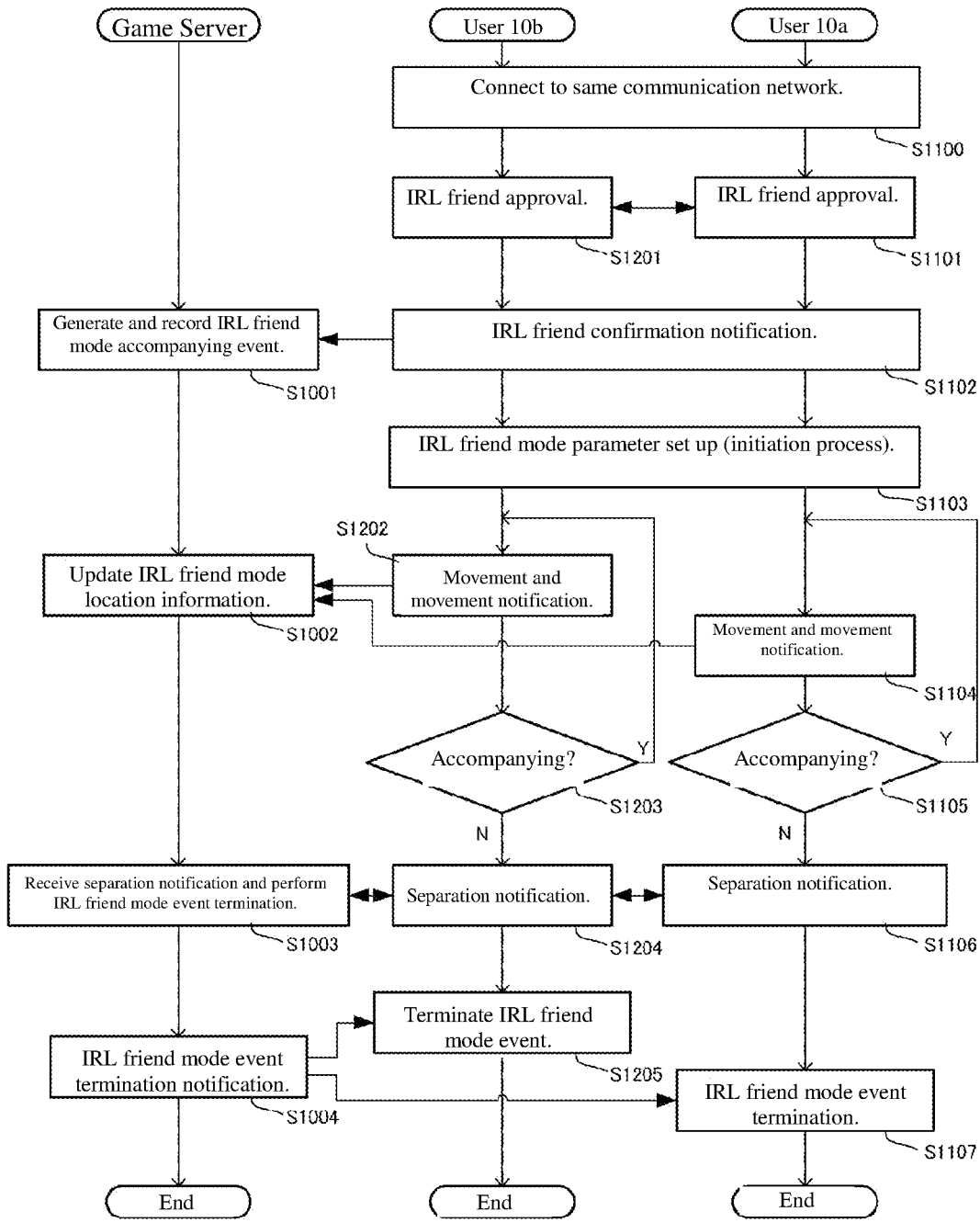

[FIG. 23]
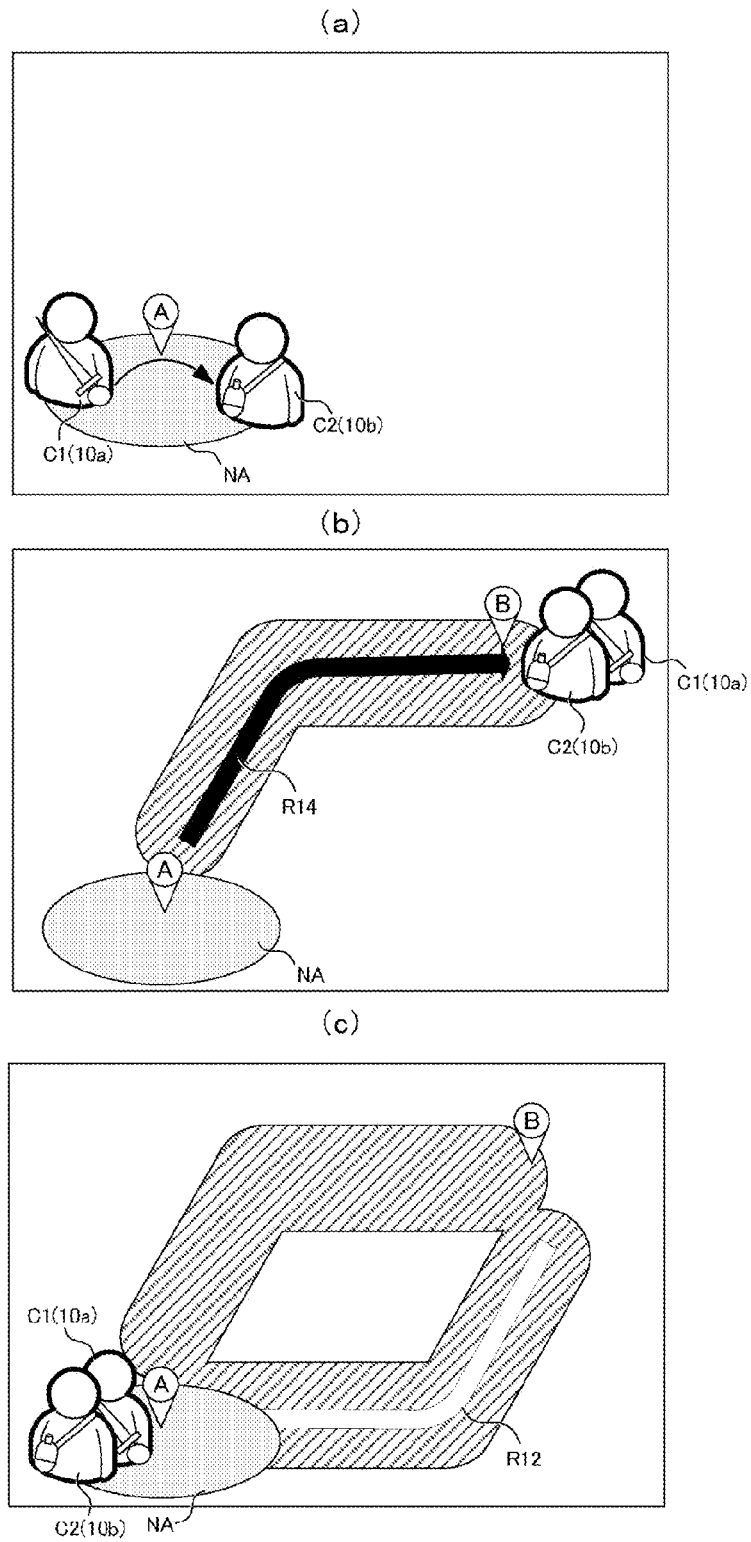

[FIG. 24]
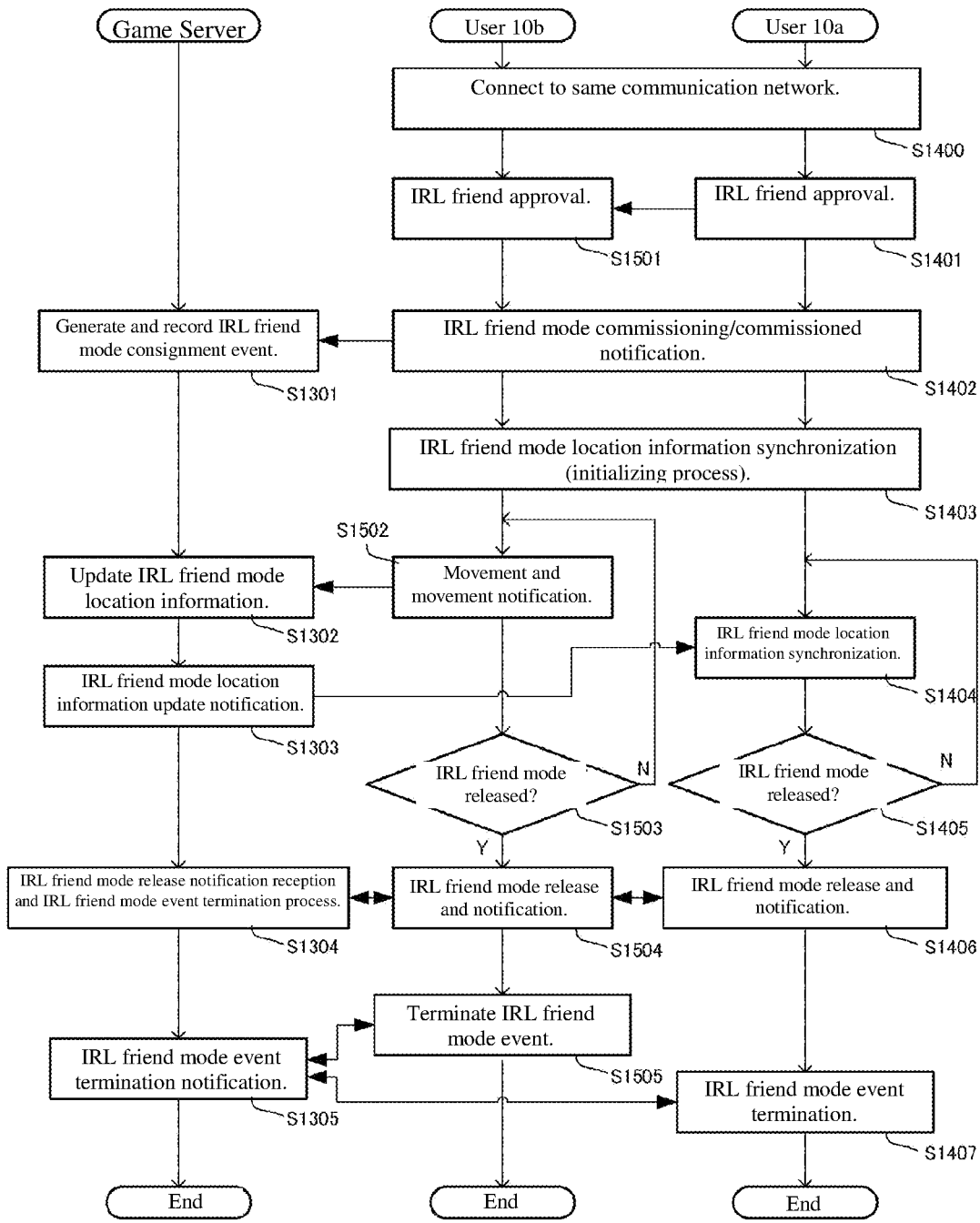

INPUT INTERFACE SYSTEM AND LOCATION-BASED GAME SYSTEM

FIELD OF TECHNOLOGY

The present invention relates to a system, control method, and program in relation to a location-based game that uses a smartphone, a game machine, or the like, where the game progresses in the virtual world based on points that are applied correlated to distance of travel of a user in the real world, and wherein event processes that are generated accompanying travel of a user are performed sequentially, and relates to an input interface system, input interface control method, and control program used in the location-based game.

PRIOR ART

Conventionally, with the rising popularity of portable information processing devices, such as smartphones, mobile telephones, mobile PCs, and the like, which carry out data communication through wireless communication, there have been advances in multifunctionality, such as the ability to use location information services such as GPS.

In recent years, a variety of games have been proposed that take advantage of the portability and location information services of such information processing devices (such as, for example, in Patent Document 1). In the technology disclosed in Patent Document 1, a game system is structured wherein the current location and travel in the real world, obtained through a GPS, or the like, is displayed and controlled, as a virtual location and virtual travel on a screen displayed in a role-playing game (a virtual world), and when the location is on an event icon, a second virtual world is displayed. This enables provision of a system that achieves a new form of entertainment that uses the location information, through combining the real location information with a conventional game system or a game system that has not existed conventionally, enabling enjoyable exercise wherein pedestrians actually travel.

Additionally, in role-playing games, often standard event processing occurs repetitively, such as battles with monsters, in order to obtain points, experience value, items, or the like, and the design is such that the story is advanced through sequentially executing these event processes.

PRIOR ART DOCUMENTS

Patent Documents

Patent Reference 1: Japanese Unexamined Patent Application Publication 2001-70658

DISCLOSURE OF THE INVENTION

Problem Solved by the Present Invention

However, it is necessary to direct event processes, such as battles, that are generated repetitively in the role-playing game described above in order to gradually level-up to improve the difficulty and entertainment value of the game; however, if operating through merely selecting and tapping a command to be inputted, the game would become monotonous, which would negatively affect the entertainment value, while, on the other hand, if the operation were too complex, this would negatively effect the ease of operations and cause the game to be difficult, which would also have a negative effect on the entertainment value.

Given this, the present invention is to solve problems such as described above, and the object is to provide a system, control method, and program relating to a location-based game able to improve the entertainment value of the game through achieving increased variety in the operations in the event processes, such as battles, that are generated during the game, and to provide an input interface system, input interface control method, and control program that can be used in the location-based game.

Means for Solving the Problem

In order to solve the problem set forth above, a first invention is an input interface system for a game wherein the game progresses in the virtual world based on points that are applied corresponding to the distance of travel of a user in the real world, and event processes that are generated accompanying travel of the user are carried out sequentially, comprising: inputting means for receiving an input of a user operation in respect to a virtual object that appears in an event process, and event execution processing means for progressing the game by defining that an event process has been performed when a user operation is inputted correctly into the inputting means, wherein: the user operation is a path inputting operation wherein a path is drawn on a touch screen, and the event execution processing means perform an event process based on the shape of the path that was drawn in the path inputting operation and on the relative positioning with a virtual object.

Moreover, the first invention is an input interface controlling method for a game wherein the game progresses in the virtual world based on points that are applied corresponding to the distance of travel of a user in the real world, and event processes that are generated accompanying travel of the user are carried out sequentially, including: an inputting step wherein inputting means receive an input of a user operation in respect to a virtual object that appears in an event process, and an event execution processing step wherein event execution processing means progress the game by defining that an event process has been performed when a user operation is inputted correctly in the inputting step, wherein: the user operation is a path inputting operation wherein a path is drawn on a touch screen, and an event execution processing step an event process is performed based on the shape of the path that was drawn in the path inputting operation and on the relative positioning with a virtual object.

A second invention is a location-based game system wherein the game is progressed in a virtual world in correlation with travel distance of a user in the real world, comprising: a virtual display data generating portion for generating virtual objects in accordance with the progression of the game accompanying movement of the user; and a compositing processing portion for superimposing and displaying a generated virtual object on real map information; and a proxy object controlling portion for moving a virtual proxy object that is associated with the user virtually on the real world map in accordance with a prescribed algorithm, wherein: the virtual object is a block that has a planar shape corresponding to geographical information in the real world, and that is covered, in whole or in part, on the real map; and each block appears in an inactive state on the real map along the travel path accompanying travel of the user in the real world, or virtual travel of a proxy object, and is transitioned to the active state through a selection operation by the user.

A second invention is a controlling method for a location-based game system wherein the game is progressed in a virtual world in correlation with travel distance of a user in the real world, including: a compositing process step wherein a virtual display data displaying portion generates a virtual object depending on the progress of the game accompanying travel of the user, a compositing processing portion displays, superimposed on real map information, the virtual object that has been generated; and a proxy object controlling step wherein a proxy object controlling portion causes a virtual proxy object that is associated with the user to move virtually on the real world map in accordance with a prescribed algorithm, wherein: in the compositing process step the virtual object is a block that has a planar shape corresponding to geographical information in the real world, and that is covered, in whole or in part, on the real map; and each block appears in an inactive state on the real map along the travel path accompanying travel of the user in the real world, or virtual travel of a proxy object, and is transitioned to the active state through a selection operation by the user.

A third invention is a location-based game system wherein the game is progressed in a virtual world in correlation with travel distance of a user in the real world, comprising: a virtual display data generating portion for generating virtual objects in accordance with the progression of the game accompanying movement of the user; a compositing processing portion for superimposing and displaying a generated virtual object on real map information; an other-user location information acquiring portion for acquiring information in relation to the location of another user; and a travel path updating portion for adding to the travel path of the local terminal, or replacing the travel path of the local terminal with, the travel path of the other user, acquired by the other-user location information acquiring portion, wherein: the virtual object is a block that has a planar shape corresponding to geographical information in the real world, and that is covered, in whole or in part, on the real map; and each block appears in an inactive state on the real map along the travel path accompanying movement of the user in the real world or the travel path that is updated by the travel path updating portion, and is transitioned to the active state through a selection operation by the user.

A third invention is a controlling method for a location-based game system wherein the game is progressed in a virtual world in correlation with travel distance of a user in the real world, including: a compositing process step wherein a virtual display data displaying portion generates a virtual object depending on the progress of the game accompanying travel of the user, a compositing processing portion displays, superimposed on real map information, the virtual object that has been generated; and a travel path updating portion step wherein information regarding the location of another user is acquired, and wherein a travel path updating portion adds to the travel path of the local terminal, or replaces the travel path of the local terminal with, the travel path of the other user that has been acquired, wherein: in the compositing process step the virtual object is a block that has a planar shape corresponding to geographical information in the real world, and that is covered, in whole or in part, on the real map; and each block appears in an inactive state on the real map along the travel path accompanying movement of the user in the real world or the travel path that is updated by the travel path updating portion, and is transitioned to the active state through a selection operation by the user.

A fourth invention is a location-based game system wherein the game is progressed in a virtual world in correlation with travel distance of a user in the real world, comprising: a virtual display data generating portion for generating virtual objects in accordance with the progression of the game accompanying movement of the user; a compositing processing portion for superimposing and displaying a generated virtual object on real map information; and a link executing portion for executing a process for linking with another user, based on prescribed conditions, wherein: the virtual object is a block that has a planar shape corresponding to geographical information in the real world, and that is covered, in whole or in part, on the real map; and each block appears in an inactive state on the real map along the travel path accompanying movement of the user or the other user in the real world, and depending on the linking state by the link executing portion, and is transitioned to the active state through a selection operation by the user.

A fourth invention is a controlling method for a location-based game system wherein the game is progressed in a virtual world in correlation with travel distance of a user in the real world, including: a compositing process step wherein a virtual display data displaying portion generates a virtual object depending on the progress of the game accompanying travel of the user, a compositing processing portion displays, superimposed on real map information, the virtual object that has been generated; and a link executing step wherein a link executing portion executes a process for linking with another user, based on prescribed conditions, wherein, in the compositing process step: the virtual object is a block that has a planar shape corresponding to geographical information in the real world, and that is covered, in whole or in part, on the real map; and each block appears in an inactive state on the real map along the travel path accompanying movement of the user or the other user in the real world, and depending on the linking state by the link executing portion, and is transitioned to the active state through a selection operation by the user.

Note that the system or method according to the present invention, described above, may be achieved through executing, on a computer, a program according to the present invention, written in a prescribed language. That is, the program according to the present invention may be installed in IC chips or a memory device of a mobile terminal device or a smartphone, a wearable terminal, a mobile PC, or another information processing terminal, or a general-purpose computer such as a personal computer or a server computer, and executed on a CPU to structure a system having the various functions described above, to implement the method according to the present invention.

That is, an input interface program according to the present invention relates to a game wherein event processes that are generated accompanying user traveling are executed sequentially, wherein the game is progressed in a virtual world based on points that are applied in correlation with travel distance of a user in the real world, and causes a computer to function as: inputting means for receiving inputting of a user operation in respect to a virtual object that appears in the event processing; and event execution processing means for progressing the game by defining the event process as having been executed when a user operation has been inputted correctly in the inputting step, wherein: the user operation is a path inputting operation wherein a path is drawn on the touch screen, and the event processing means perform an event process based on the shape of the path that is drawn in the path inputting operation, and on the position relative to a virtual object.

The present invention is a location-based game program wherein the game is progressed in a virtual world in correlation with travel distance of a user in the real world, for causing a computer to function as: a virtual display data generating portion for generating virtual objects in accordance with the progression of the game accompanying movement of the user; a compositing processing portion for superimposing and displaying a generated virtual object on real map information; and a proxy object controlling portion for moving a virtual proxy object that is associated with the user virtually on the real world map in accordance with a prescribed algorithm, wherein: the virtual object is a block that has a planar shape corresponding to geographical information in the real world, and that is covered, in whole or in part, on the real map; and each block appears in an inactive state on the real map along the travel path accompanying travel of the user in the real world, or virtual travel of a proxy object, and is transitioned to the active state through a selection operation by the user.

Moreover, the present invention is a location-based game program wherein the game is progressed in a virtual world in correlation with travel distance of a user in the real world, for causing a computer to function as: a virtual display data generating portion for generating virtual objects in accordance with the progression of the game accompanying movement of the user; a compositing processing portion for superimposing and displaying a generated virtual object on real map information; an other-user location information acquiring portion for acquiring information in relation to the location of another user; and a travel path updating portion for adding to the travel path of the local terminal, or replacing the travel path of the local terminal with, the travel path of the other user, acquired by the other-user location information acquiring portion, wherein: the virtual object is a block that has a planar shape corresponding to geographical information in the real world, and that is covered, in whole or in part, on the real map; and each block appears in an inactive state on the real map along the travel path accompanying movement of the user in the real world or the travel path that is updated by the travel path updating portion, and is transitioned to the active state through a selection operation by the user.

The present invention is a location-based game program wherein the game is progressed in a virtual world in correlation with travel distance of a user in the real world, for causing a computer to function as: a virtual display data generating portion for generating virtual objects in accordance with the progression of the game accompanying movement of the user; a compositing processing portion for superimposing and displaying a generated virtual object on real map information; and a link executing portion for executing a process for linking with another user, based on prescribed conditions, wherein: the virtual object is a block that has a planar shape corresponding to geographical information in the real world, and that is covered, in whole or in part, on the real map; and each block appears in an inactive state on the real map along the travel path accompanying movement of the user or the other user in the real world, and depending on the linking state by the link executing portion, and is transitioned to the active state through a selection operation by the user.

The invention of these programs enables distribution through, for example, a communication circuit, and enables transferring, as a package application that runs on a stand-alone computer, through storing on a computer-readable storage medium. It is possible to record onto a variety of recording media such as, specifically, magnetic recording media such as flexible discs, cassette tapes, or the like, or onto optical discs such as CD-ROMs, DVD-ROMs, and the like, or RAM cards, and so forth. Additionally, the computer-readable storage medium on which the program is stored enables the system and method, described above, to be executed easily using a general-purpose computer or specialized computer, and enables the program to be stored, transported, and installed easily.

Note that the path inputting operation in the invention set forth above preferably is a slash that is drawn so as to contact a virtual object, or a text or a graphic, depending on the current location of the user. Moreover, the virtual object in the present invention may be an object that moves relative to the background in a virtual space, or an object that is displayed superimposed on real map information.

In the invention set forth above, in an event process that is performed through the path inputting operation, preferably the shape of the path that is inputted through the inputting operation, and the effects of the command that is executed depending on that path, will vary depending on the user location information, virtual proxy objects that relate to the user, or the form of a link with another user.

Preferably the present invention, set forth above, comprises an external travel record acquiring portion for acquiring virtual travel of the proxy object or travel of the user, in a state wherein the user travel cannot be detected.

Preferably the invention set forth above further comprises: a display restricting portion for restricting a display regarding the current location of the other user when the current location of the other user is in proximity, within a prescribed distance, from the current location of the local terminal.

In the invention set forth above, preferably: the link executing portion executes a linking process if the current location of another user and the current location of the local terminal are in proximity within a prescribed distance and the travel path of the local terminal and the travel path of the other user match each other. Moreover, preferably the invention set forth above further comprises: a link authenticating portion for detecting an approving operation by the user and the other user in a state wherein the user and the other user are within a prescribed communication area, wherein: the link executing portion executes the linking process based on an approval process by the link authenticating portion.

Effects of the Invention

The first invention can improve the entertainment value of the game to the ability to achieve an increase in the variety of operations in event processes such as battles, or the like, that are generated during the game, through the ability to input commands using slashes that are drawn in contact with virtual objects, or text or graphics, depending on the current location of the user, in order to cause event processing to be carried out based on the shape of the path that is drawn, and the location relative to the virtual object, through inputting a user operation wherein a path is drawn on a touch screen in a game such as one wherein standard event processes are performed sequentially, such as a role-playing game.

The second invention enables the game to be progressed automatically even when a location wherein the user himself/herself cannot go or does not have time to go, through the ability to progress the game by moving a virtual proxy object, associated with the user, on real map information following a prescribed algorithm, such as deploying "fantasyizing" that displays virtual objects superimposed on real map information, through adding a travel path through the travel of, for example, a monster in a location-based game wherein the game progresses in the virtual world correlated to the distance of travel of the user in the real world. A proxy object can be acquired automatically through, for example, location information acquiring means equipped on the operating system (OS) side of the information terminal or location monitoring by the game server side, enabling achievement of an increase in variety of the game system through, for example, progressing the game automatically even if the game application has not been started, or even if the power supply of the information terminal has been turned OFF, enabling an improvement in the entertainment value of the game.

The third invention enables the game to progress through reflecting, into the progress of the game, travel by another user, even for a location wherein the user himself or herself cannot go or does not have time to go, through the ability to provide a "piggyback function" that adds to the travel path of the user's device, or substitutes for the travel path of the users device, a travel path acquired for another user, through acquiring information relating to the location of another user, in a location-based game wherein the game is progressed in the virtual world correlated to the distance of travel of a user in the real world. Moreover, through this "piggyback function," it is possible to cause the game to progress through establishing communication with another user, enabling an improvement in the entertainment value of the game through achieving an increase in variety in the game system.

A fourth invention enables improvement to the entertainment value of the game through increasing the variety of the game system through the ability to cause the game to progress by establishing communication with another user through defining a relationship with another user wherein the travel of the user is significant in the game, through a so-called "IRL ("in real life") friend function" for executing a linking process when the travel path of a given user is coincident with the user path of another user, or is present within a prescribed communication area, in a location-based game wherein the game is advanced in the virtual world correlating to the distance of travel of a user in the real world.

BRIEF DESCRIPTIONS OF THE DRAWINGS

FIG. 1 is a conceptual diagram depicting the overall structure of a game system in an embodiment.

FIG. 2 is an explanatory diagram depicting the relationship between a real map M1 and a virtual map M2 in an embodiment.

FIG. 3 is a block diagram depicting the internal configuration of a game server 3 in an embodiment.

FIG. 4 is a block diagram depicting the internal structure of a smartphone 1 in an embodiment.

FIG. 5 is an explanatory diagram depicting the relationship between character travel and a fantasyizing process in an embodiment.

FIG. 6 is an explanatory diagram depicting the state transitions in the fantasyizing process according to the embodiment.

FIG. 7 is an explanatory diagram depicting the operation of the fantasyizing process in an embodiment.

FIG. 8 is an explanatory diagram regarding accumulation of points through repetitive round-trip travel in an embodiment.

FIG. 9 is an explanatory diagram depicting a block filling operation in a fantasyizing process in an embodiment.

FIG. 10 is a flowchart depicting the procedure for a points issuing process in an embodiment.

FIG. 11 is a sequence diagram depicting a group processing operation in an embodiment.

FIG. 12 is an explanatory diagram depicting an example of an individual inputting operation in an embodiment.

FIG. 13 is an explanatory diagram depicting an example of an individual inputting operation in an embodiment.

FIG. 14 is an explanatory diagram depicting an example of a group processing operation in an embodiment.

FIG. 15 is an explanatory diagram depicting an example of a group processing operation in an embodiment.

FIG. 16 is an explanatory diagram depicting a monster painting mode in an embodiment.

FIG. 17 is a flow chart depicting operations in the monster painting mode in an embodiment.

FIG. 18 is an explanatory diagram depicting a piggyback mode according to an embodiment.

FIG. 19 a flow chart depicting operations in the piggyback mode according to an embodiment.

FIG. 20 is an explanatory diagram depicting a personal information protecting function in the piggyback mode according to an embodiment.

FIG. 21 is an explanatory diagram depicting an IRL friend accompanying mode according to an embodiment.

FIG. 22 a flow chart depicting operations in the IRL friend accompanying mode according to an embodiment.

FIG. 23 is an explanatory diagram depicting an IRL friend consignment mode according to an embodiment.

FIG. 24 is a flow chart depicting operations in the IRL friend consignment mode according to an embodiment.

FORMS FOR EMBODYING THE PRESENT INVENTION

An embodiment wherein the input interface system, control method, and program according to the present invention is applied to a game system will be explained below, referencing the appended drawings. Note that in the embodiment given below, a device for embodying the technical concept of the invention is given as an illustrative example, and in the technical concept of the present invention, the materials, shapes, structures, layout, and the like, of the various structural components are not limited to that which is described below. A variety of changes can be applied in the technical concept of the present invention within the scope of patent claims.

(Overall Structure of the Game System)

FIG. 1 is a conceptual diagram depicting the overall structure of a game system according to the present embodiment. As illustrated in FIG. 1, the game system according to the present embodiment is a system for operating a game wherein the game is progressed in a virtual world based on points that are applied correlated to the distance of travel of a user in the real world, where event processes that are generated accompanying travel of a user are performed sequentially. Specifically, the game system according to the present embodiment is structured basically from a smartphone 1, which is a mobile terminal device used by a user 10, and a game server 3 that is located on the Internet 2. Note that in the present embodiment a smartphone 1 is explained as an example of a mobile terminal device.

The game server 3 is a server for carrying out game progress processing in the present embodiment, and can be achieved through a single server machine or a plurality of server machines, where a plurality of function modules is structured virtually on a CPU(s), where processes are executed through cooperation of the individual function modules. Moreover, the game server 3 is able to send and receive data over the Internet 2 through a communication function, and also able to display web pages via browser software, through a web server function.

The smartphone 1 is a mobile information processing terminal device that uses wireless communication, where a relay point, such as a wireless base station 22, communicates via wireless signals with the mobile telephone device, to enable communication services, such as voice communication and data communication, to be received during travel. The communication system of the mobile telephone device may be, for example, a 3G (third generation) system, an LTE (Long Term Evolution) system, a 4G system, an FDMA system, a TDMA system, a CDMA system, or W-CDMA, or may be a PHS (Personal Handyphone System) system, or the like. Moreover, "smartphone 1" includes also mobile computers such as tablet PCs, or the like, in which a variety of functions, such as a digital camera function, a function for executing application software, a function for acquiring location information through GPS (Global Positioning System), or the like, and so forth are provided.

The location information acquiring function is a function for acquiring and storing location information that indicates the location of the device, where the location information acquiring function may be, for example, a method for detecting the location of the device through a signal from a satellite 21, as in a GPS, for example, as illustrated in FIG. 1, or a method for detecting the location through the strength of a radio signal from a mobile telephone wireless base station 22 or a Wi-Fi communication access point.

Additionally, the smartphone 1 is provided with a liquid crystal display as a displaying portion for displaying information, and also provided with an operating device, such as operating buttons, for the user to carry out input operations, where the operating device may be a touch panel as an inputting means for acquiring an operation signal through a touch operation that designates a coordinate location on a liquid crystal display, disposed superimposed on the liquid crystal display. Specifically, the touch panel is an inputting device for inputting an operation signal through detection of pressure or an electrical charge through a touch operation by the user using a fingertip, a pen, or the like, and is structured through layering together a liquid crystal display, for displaying graphics, and a touch sensor for receiving an operation signal corresponding to a coordinate location on a graphic that is displayed on the liquid crystal display.

(Internal Structures of the Individual Devices)

The internal structures of the various devices for structuring the game system described above will be explained next. FIG. 3 is a block diagram depicting the internal structure of a game server 3 according to the present embodiment, and FIG. 4 is a block diagram depicting the internal structure of a smartphone 1 according to the present embodiment. Note that the term "module," used in the explanation, indicates a functional unit for achieving a prescribed operation, structured through hardware, such as an apparatus, a device, or the like, through software that has the function, or through a combination thereof.

(1) Game Server

The internal structure of a game server 3 will be explained first. The game server 3 is a server machine that is located on the Internet 2, and carries out exchange of data with individual smartphones 1 through the Internet 2. The game server 3 comprises: a communication interface 31 for carrying out data communication through the Internet 2; an authenticating portion 33 for authenticating the user and the user terminal authorities; a location information controlling portion 32 for collecting and controlling location information of each individual user terminal; a game progress processing portion 36 for executing game progress procedures for each individual user; a virtual map information controlling portion 37 for generating virtual map information; a 34 for distributing game data to the various users; and a group of various databases.

The database group includes: a real map database 35a as a real map storing portion for storing real map information that includes geographical information in the real world; a user database 35b for storing information regarding users; a game database 35c for storing virtual map information, information relating to the game progress process for the game as a whole and game progress process for each of the individual users; and a point database 35d for controlling points that have been issued. These various databases may be a single database, or may be divided into a plurality of databases, and may be formed as a relational database wherein the various data are linked to each other through the establishment of relationships therebetween.

The real map database 35a is a storage device for storing real map information that includes geographical information in the real world, storing natural geographic elements (such as mountains, valleys, rivers, and the like), artificial objects (such as buildings, roads, railways, and the like), along with place names, addresses, traffic constraints, and so forth. Note that the real map database 35a may be a map database that is owned and operated by the service provider itself that operates the game server 3, or may be a map database that is operated by a separate map service provider.

The information stored in the user database 35b includes authentication information that links an identifier (user ID and/or terminal ID) for identifying the user or the mobile terminal device used by the user with a password, or the like, along with user personal information that is linked to the user ID, the model of the terminal device, and so forth. Moreover, the user database 35b stores also the authentication history (access history) for each individual user or each individual user terminal, information regarding game progress for each individual user, through relationships with the game database 35c (the latitude/longitude, etc., of the current location, status and score in the game, use history, and the like), relevant payment settlement information during the game, and so forth.

The information accumulated in the game database 35c includes data for the game, such as virtual world map information, characteristics of characters and objects, information relating to event processes, graphic information, and the like, and also mapping data for connecting these game data to geographic elements, buildings, roads, railways, and the like, that are included on the real map. The point database 35d controls issued points linked to users, user terminals, or applications, and stores a history of use of the various points.

The authenticating portion 33 is a module for performing an authentication process for each individual communication session that is established, through establishing communication sessions with the individual smartphones 1 through the communication interface 31. The authentication process acquires authentication information from the smartphone 1 of the user who is the accessing party, and references the user database 35b to identify the user, or the like, to authenticate the authorities thereof. The authentication results by the authenticating portion 33 (the user ID, authentication timestamp, session ID, and the like) are sent to the game progress processing portion 36 and also stored as authentication history in the user database 35b.

The location information controlling portion 32 is a module that acquires the location information that is acquired by the user terminal device side and transmitted to the game server 3, where the location information controlling portion 32 stores, as use history, the identifier of the user or user terminal device that is identified by the authentication process by the authenticating portion 33 (the user ID, terminal ID, or the like), linked to the location information, in the user database 35b.

The game progress processing portion 36 is the module that causes the game to progress in the virtual world by moving each of the characters that correspond to the individual users, the monsters, and other objects, and generating a variety of event processes, and that executes a given game program or input interface controlling program that includes rules, logic, and algorithms, to generate event processes such as encounters/battles, minigames, playback of movies, fantasyizing of blocks, and the like, depending on positional relationships of characters or objects (proximity, contacts, or the like). Note that in the present embodiment, the game progress processing portion 36 cooperates with a game progress processing portion 141 on the smartphone 1 side, so that a portion of the game progress processing is carried out by the game server 3 side, and a portion of the graphic processing, event processing, and the like, is executed by the game progress processing portion 141 on the smartphone 1 side. For example, on the game server 3 side, an event process that may be produced based on the location of the character of another user, the location of an object, or the like, is forecasted, the event conditions are generated on the game server 3 side, those conditions are transmitted to the smartphone 1 side, and the actual generation of the event processes and the graphic processes is performed on the smartphone 1 side based on the event conditions received from the game server 3 side.

The virtual map information controlling portion 37 is a module for administering and controlling the generation, storage, and distribution of a virtual map M2 that includes object coordinate information for characters of other users, buildings, and the like, in the virtual geographical information that corresponds to geographical information on the a map M1, as depicted in FIG. 2, accompanying progress of the game by the game progress processing portion 36. In the present embodiment, points Tp are issued depending on the distance actually traveled by a user 10 on the real map M1, where a character C1 that corresponds to the user 10 travels on the virtual map M2 through spending of these points Tp, enabling blocks B0 that are adjacent to the path of travel to be fantasyized. In this fantasyizing, as depicted in FIGS. 7 (a) and (b), through a user touching a block B0, which is divided into a shape corresponding to a city block that is adjacent to the path, the block B0 that has been touched will be fantasyized, where various types of blocks B2 through B5 are displayed superimposed on the city blocks of the real map M1 in the virtual map.

Note that points Tp may be applied to the user depending on the frequency or interval of accessing the game server, or may be purchased through a monetary payment or points, through a payment settlement operation by the user, a billing process on the server side, or the like. Moreover, the points Tp may be applied arbitrarily through completion of a prescribed event in the game, a score in a minigame, or the like, leveling-up of a character, clearing a level, or the like.

Note that the virtual map M2 may be generated on the game server 3 side, may be generated on the smartphone 1 side, or may be generated through cooperation of both the game server 3 and the smartphone 1, where the virtual map information controlling portion 37 controls the virtual map M2 that is generated and stored on the game server 3 side, and the information, regarding the virtual map M2, that is generated and stored on the smartphone 1 side, and compares both of these virtual map M2, and, as necessary, performs synchronization of the two through distributing, to the smartphone 1 side, either the entirety of, or a portion of, the virtual map M2.

When the virtual map M2 is generated on the game server 3 side, the virtual map information controlling portion 37 acquires the geographic elements, buildings, roads, railways, and the like, that are included in the real map M1 that is stored in the real map database 35a, and also references the mapping data that is stored in the game database 35c, to generate the virtual map M2 through dividing map information of the virtual world into block B0 units, based on map information for the virtual world that corresponds to the real map M1, characteristics (attributes) of characters and objects, information regarding event processes, graphic information, and the like.

The game data distributing portion 34 is a module for distributing, to individual users through the communication interface 31, map information and virtual world graphics to synchronize the virtual map M2 generated by the virtual map information controlling portion 37, following control by the virtual map information controlling portion 37, based on the current location of the user. Note that the virtual world graphics are divided into blocks for each individual city block corresponding to the real map M1, and distributed by the block unit.

(2) Smartphone 1

The internal structure of the smartphone 1 will be explained next. As illustrated in FIG. 4, the smartphone 1 comprises, as a module related to the user interface for the game system: a CPU 17, a communication interface 11, an input interface 12; an output interface 13; and a memory 15.

The communication interface 11 is a communication interface for carrying out data communication, and is provided with functions for non-contact communication, through radio signals, or the like, and for contact (physically wired) communication, through a cable, adapter means, or the like. The input interface 12 is a device for inputting a user operation, such as of a mouse, keyboard, operating button, touch panel 12a, or the like. The output interface 13 is a device for outputting images and sounds, such as a display, a speaker, or the like. In particular, a displaying portion 13a, such as a liquid crystal display, or the like, is included in the output interface 13, where the displaying portion is superimposed on the touch panel 12a that is the input interface.

The memory 15 is a storage device for storing the OS (Operating System), firmware, various types of application programs, other data, and the like, where, in addition to the user ID for identifying the user, game application data that is downloaded from the game server 3 is stored in the memory 15, and game data, and the like, processed by an application executing portion 14, is also stored therein. In particular, in the present embodiment, the virtual map M2 and real map M1 that are acquired from the game server 3 is stored in the memory 15. The virtual map M2 is stored by block units that have been divided into shapes corresponding to the city blocks in the real map M1.

The CPU 17 is a calculation processing device, where various types of functional modules are structured virtually through execution of an OS (operating system: basic software) stored in a memory 15, and of firmware, and the like, where the system of the present invention is structured from the various functional modules. In the present embodiment, the OS 17a is executed on the CPU 17, where an application executing portion 14 is structured in the OS 17. Moreover, various software are executed in parallel in the OS 17a, where an OS-side location information acquiring portion 17b is executed as a resident program that operates continuously in the OS 17.

The OS-side location information acquiring portion 17b is one basic function that is provided in the OS 17a, and operates continually on the OS, where a method such as detecting the location of the device through signals from satellites, such as in GPS, or a method wherein the location is detected through the strength of radio signals from mobile telephone radio base stations or Wi-Fi communication access points, or the like, is executed, and the history of the location information and a travel record are recorded as log data on the OS 17 side. The log data for location information, recorded by the OS-side location information acquiring portion 17b, may be transferred for storage to a control server on a communication network, or may be stored in a memory 15 to be read out from the application side as necessary. In the present embodiment, the location information for the terminal, while the game program has not yet been started and the location information acquiring portion 144 cannot detect the current location of the user, is recorded by the OS-side location information acquiring portion 17b, and the recorded location information is provided in response to a request from an external travel record acquiring portion 143f that is structured in the application executing portion 14.

The application executing portion 14 is a module for executing applications, such as a general game application, browser software, and the like, and normally is structured in a CPU 17, or the like. In this application executing portion 14, a game progress processing portion 141, a synchronization processing portion 142, an event processing portion 143, a display data generating portion 146, a display controlling portion 145, and a location information acquiring portion 144 are structured virtually through execution of a game program according to the present invention.

The game progress processing portion 141 is a module that advances the game through moving, in the virtual world, the individual characters corresponding to the individual users, along with monsters and other objects, and through generating a variety of event processes, through the same rules, logic, and algorithms as the game program that is executed by the game server 3, and, through the synchronization processing portion 142, synchronizes with the game progress processing portion 36 of the game server 3 side, to generate event processes, such as encounters/battles, minigames, playback of movies, fantasyizing of blocks, and the like, depending on positional relationships with characters and objects (proximity, contact, or the like).

In the present embodiment, the game progress processing portion 141 cooperates with the game progress processing portion 141 of the game server 3 side, so that a portion of the game progress processing portion 141 is carried out on the game server 3 side, and a portion of the graphic processing and event processing is executed by the game progress processing portion on the smartphone 1 side. For example, the conditions for generating an event are generated on the game server 3 side and these conditions are sent to the smartphone 1 side, and the actual generation of event processes, and the graphic processes related thereto, are executed on the smartphone 1 side.

The synchronization processing portion 142 is a module for synchronizing the game progress processing on the smartphone 1 side and the game progress processing on the game server 3 side. Specifically, on the game server 3 side, event processes that may be generated are forecasted based on the locations of characters of other users, the locations of objects, and the like, and generation conditions that are forecasted are set by the game server 3 side, where the conditions that have been set are transmitted to the smartphone 1 side. The event conditions that are transmitted from the game server 3 are received by a synchronization processing portion 142, and the generation of actual event processes, and the graphic processes accompanying them, is performed by the game progress processing portion 141 on the smartphone 1 side based on the event conditions received from the game server 3. The results of event processes that have been executed by the game progress processing portion 141 on the smartphone 1 side (victory/loss, or score of battles and minigames, fantasyizing of city blocks, and the like) are sent to the game progress processing portion 141 of the game server 3 side through the synchronization processing portion 142, to be applied to the game progress processing thereafter.

Moreover, the event processing portion 143 is a module that monitors the event processes generated by the game progress processing portion 141 and the travel speed of the current location of the device, acquired by the location information acquiring portion 144, and if the travel speed of the current location is equal to or greater than a prescribed value and the event process generated by the game progress processing portion 141 is an event for which group processing is possible, enables group processing in the event process, where the game progress processing portion 141 is structured so as to enable a group completion operation, instead of a plurality of standard operations, in events wherein group processing is possible, to enable progress in the game through abbreviated operations. The synchronization processing portion 142 provides notification to the game progress processing portion 141 on the game server 3 side regarding event processes performed with abbreviated operations by the event processing portion 143, and notifies the game server 3 side that the game has progressed through abbreviated operations for the event process for which the event process event conditions have been satisfied.

Furthermore, the event processing portion 143, as shown in FIG. 14(b) comprises: a link authenticating portion 143a, a link executing portion 143b, a travel path updating portion 143c, an other-user location information acquiring portion 143d, a proxy object controlling portion 143e, an external travel record acquiring portion 143f, a display restricting portion 143g, and an event execution processing portion 143h.

The link authenticating portion 143a is a module that executes a confirmation process by detecting a confirmation process between the user and another user when carrying out the game linked with another user, through a function for linking with the other user, such as the "piggyback mode," or the "IRL friend mode." As the confirmation process by this link authenticating portion 143a, security levels are set differently for the "piggyback mode," and the "IRL friend mode." The piggyback mode is a security level so as to establish a link if one user who knows personal information that has been revealed to a specific user, such as, for example, an account ID, email address, mobile telephone number, or the like, sends a request to another user in order to establish a link, even between users who have never actually met, such as acquaintances on an SNS, and the other user, approves the request. In contrast, in the "IRL friend mode" the security level is one where, in addition to knowing the personal information such as the account ID, email address, or the like, described above, the approval operation (the request and the approval) must be executed in a state wherein both users are simultaneously within a prescribed communication area to establish the link. The "prescribed communication area" includes being in the same Wi-Fi network, the same short-range network such as Bluetooth, or a range wherein transmission and reception of infrared signals or audio signals is possible, or an extremely short-range wherein actions such as shaking the terminals are performed simultaneously, or the like.

The link executing portion 143b is a module for executing the process for linking with another user based on prescribed conditions in functions with links to other users, such as the "piggyback mode" and the "IRL friend mode," and the like, and performs functions such as acquiring location information for the other user on the piggybacked side through the other-user location information acquiring portion 143d, adding to, or replacing, the local travel path, the travel path of the other user on the piggybacked side in the travel path updating portion 143c, and executing other linked processes. Moreover, in an IRL friend accompanying mode the link executing portion 143b performs a function for executing functions for executing a linking process when the travel path of the local terminal and the travel path of the other user match each other, when the current location of the other user and the current location of the local terminal are in proximity within a prescribed distance. Here the linking process includes a process for changing parameters, such as increasing the sizes or numbers of fantasyized blocks, increasing travel speed, increasing attack strength in battle, and the like, if one user travels in a state with another user in piggyback in the piggyback mode, or if two individuals in a family or close friends travel an identical path when in the IRL friend mode.

Moreover, in the accompanying mode, a linking process is executed if the current location of another user and the current location of the local terminal are in proximity within a prescribed distance and the travel path of the local terminal and the travel path of the other user match each other. In the IRL friend mode, there is a consignment mode where one user synchronizes his or her travel with the travel of another user who has a close relationship, such as a family member or friend, and consigns his or her own game progress to the other user. In this IRL friend mode, execution of the consignment or accompanying mode is permitted based on a confirmation operation between the user and the other user, depending on whether or not the state is one wherein the user and the other user are within a prescribed communication area, such as the identical Wi-Fi area or a Bluetooth short-range network, or the like.

The other-user location information acquiring portion 143d is a module for acquiring information relating to the location of another user, that is the module for acquiring location information for the linked user that is necessary for the linked functions with the other user, such as in the "piggyback mode" or the "IRL friend mode," or the like, described below. The other-user location information acquiring portion 143d follows instructions from the link executing portion 143b to acquire location information and location updating information (travel path) for the other user (the user on the piggybacked side in the piggyback mode or the consigning user in the IRL friend mode) from the location information acquiring portion 144 or the OS-side location information acquiring portion 17b through the external travel record acquiring portion 143f, and transfers that information to the travel path updating portion 143c.

The travel path updating portion 143c is a module for acquiring a selection operation for either adding to the travel path of the local terminal, or replacing the travel path of the local terminal, with the travel path of another user, acquired by the other-user location information acquiring portion 143d, following control by the proxy object controlling portion 143e or the link executing portion 143b. Specifically, in the present embodiment, the path of travel of another user is added to, or replaces, the travel path of the local terminal, to be read in as one's own travel path, in the "monster painting mode," "piggyback mode," and "IRL friend mode."

The proxy object controlling portion 143e is a module for moving virtually, on the real map M1, following a prescribed algorithm, a virtual proxy object AO that is associated with the user, such as a monster, a mascot, a character, or the like, such as in the "monster painting mode." Here the "prescribed algorithm" may be one that selects the shortest path to a location or event indicated by a user, selects a course for exploring an area that the user has not yet visited, or the like. In the present embodiment, when the proxy object AO arrives at a branch in a path, the proxy object controlling portion 143e reads out, from the game server 3 or the memory 15, the travel paths already followed by the user (the user location and proxy object AO travel history), and selects the next path to travel based on the positional relationships between the current location and the locations already visited. At the time of this selection, weighting is applied to the various candidate paths that could serve as the next destination at the branching point, for example, depending on the amount of difference from locations that have already been visited, and a candidate path is selected through a random calculation that has a probability according to the weightings. At what will be a time that is a given distance or time from the current location of the user, a return mode will be activated, where, in the return mode, the travel will target the current location of the user while exploring locations that have not been visited.

The external travel record acquiring portion 143f is a module for acquiring travel of the user, or virtual travel of a proxy object, in a state wherein the travel of the user could not be detected, such as if the power supply of the terminal was OFF, or the application had not been launched, and, in the present embodiment, acquires the travel path recorded in the OS-side location information acquiring portion 17b if the game application has not been started despite the terminal power supply being ON, or, if not recorded in the OS-side location information acquiring portion 17b, may acquire the information from the location information controlling portion 32 on the game server 3 side. Note that although, in the present embodiment, for convenience in explanation, the external travel record acquiring portion 143f, location information acquiring portion 144, and OS-side location information acquiring portion 17b are described as separate units, these location information acquiring means may be combined together, and may be located in the game application, in another application, or in the operating system.

The display restricting portion 143g is a module for restricting the display in relation to the current location of another user (the user on the side that is being piggybacked) when a user on the side that is performing the piggybacking enters into a prescribed area that is set on the side of the user who is being piggybacked or when the current location of another user (for example, a user on the side that is being piggybacked) and the current location of the local terminal (the user on the side that is performing the piggybacking) are in proximity within a prescribed distance while a function for progressing the game while linked to another user, such as the "piggyback mode," is running.

The settings for restricting the display can be set arbitrarily by the user on the side that is being piggybacked, and it is possible to set the locations (latitude/longitude, political district unit such as administrative district, city block, municipality, prefecture, city, town, neighborhood, or the like), or time bands, or distance from the local terminal to be restricted, and also possible to set permissions for allowing displaying only when arbitrary locations or times are set, such as for, for example, during recreational travel or while events are being held, with the display prohibited otherwise. In this display restricting system, in order to prohibit displaying location information on the real map or the virtual map, and to prohibit imaging and graphic displays of the surroundings, and to not provide, to the other party, one's current location in real time, a time difference (such as, for example, a lag of several hours) may be set arbitrarily for providing information to the other party, where settings for these display restrictions can be selected or combined arbitrarily through user operations. When a time delay in displaying the current location is set, the timing with which travel is reported to the game server 3 side from the smartphone 1 side may be delayed, or the timing with which the game server 3 provides updates or notifications of location information in the piggyback mode may be delayed.

This is because the personal information of the user on the side that is being piggybacked would be revealed to the user on the side that is performing the piggybacking if the map were scrolled, or if graphics could be seen showing the surroundings, depending on the local location of the side that is being piggybacked with the game progressing with the travel path of the other user, who is performing the piggybacking, moving as if the user (that is, the user on the side being piggybacked) were holding the local terminal. In the present embodiment, in such a situation the user on the side that is being piggybacked is able to protect his or her personal information through limiting the scope of information disclosed, so as to not identify the user who is being piggybacked.

The event execution processing portion 143*h* is event execution processing means for progressing the game through executing the event processes when a user operation is inputted correctly. Commands through operations for selecting points or items to be used, or operations for inputting a path through drawing a path on the touch screen, are included in the user operations acquired by the event execution processing portion 143*h*, and the event processing portion 143 causes the event processing to be executed based on the command that has been inputted, such as the shape of the path drawn in a path inputting operation, and based on the relative positioning in relation to a virtual object.

Moreover, in the event execution processing portion 143*h*, in a battle event process that is performed in response to a path inputting operation, the form of the path (command) that is inputted through the path inputting operation, such as the direction or shape of a path, the timing of input, the location on the screen of a slash operation, or the like may be different depending on the user location information. The event execution processing portion 143*h* acquires the current location of the local terminal from the location information acquiring portion 144 or the external travel record acquiring portion 143*f*, reads out, from the memory 15, scenario data for events generated or deployed through various types of path inputting operations, and the executes events depending on the scenario data while referencing scenario data corresponding to the current location. In a form that is linked with another user, the event execution processing portion 143*h* sends an inquiry to the link executing portion 143*b*, to acquire the status of another user that is currently linked (level, number of points, travel distance, and length of time of continual linkage between the users), to determine the current linked form.

Here the scenario data that is referenced is a program or data that describes the branching or evolution of the game progress, and is tabular data assigning a correspondence of the branching or evolution of the game progress with the path input operation (command), location information, and form of the link with the other user. The event execution processing portion 143*h* references the table data based on the path operation inputted by the user, the location information such as the current locations of users (including other users), and the form of the link, acquired from the link executing portion 143*b* (the status of the other user, etc.), to select and determine the next event to be generated, the effects of an inputted command, and the evolution of an event that is being generated.

The location information acquiring portion 144 is a module for selecting and acquiring coordinate locations in the real world, to acquire the current location of the user and the current locations of other users through a global positioning system (GPS) that uses artificial satellites, through base station positioning through triangulation of the location based on a station information and the strength of radio signals from base stations, through Wi-Fi positioning using SSIDs (Service Set IDs) and states of Wi-Fi radio signals, and a database that combines the longitudes and latitudes thereof, or the like.

Moreover, the location information acquiring portion 144 is able to select an arbitrary coordinate location, to acquire location information, to measure speed of travel, etc., based on a user operation or an event that occurs in the course of the game. Additionally, the location information acquiring portion 144 is provided also with a function for acquiring the coordinate locations of arbitrary objects, and is able to search the various databases 35*a* through *c* to acquire current coordinate locations or coordinate locations on the virtual map, and the travel histories thereof.

In particular, the locations of placement at arbitrary locations on the real map information or the virtual map information of an arbitrary object, as a proxy object where the object is a proxy for the user, can be searched and acquired from the various databases 35*a* through *c*. The location, on the map information, of the proxy object is caused to travel automatically, in accordance with the progress of the game, by the game progress processing portion 36 or 141 and is linked to the current location of a specific user, and is caused to travel automatically in accordance with the progress of the game.

Moreover, in measuring a speed of travel by the location information acquiring portion 144, instantaneous travel can also be detected through a detection signal from an acceleration sensor 16, to evaluate that the user is in motion if an acceleration beyond a prescribed value is produced. Moreover, if, in the measurement of the travel speed, there is high-speed travel through, for example, the user riding in a vehicle, the user being in motion is evaluated through a change in the GPS value. In regards to this high-speed travel, if GPS signals cannot be received (when, for example, underground in a subway, or the like, or in a train station), the location information is updated through switching of Wi-Fi or of base stations in 3G, 4G, or the like, or changes in the state of reception of radio signals, where this location information is monitored, and the user is evaluated as traveling if the change in the location information is greater than with normal travel through walking. Note that in the travel evaluation through, for example, switching of base stations, the change in location information will be discontinuous, and thus the travel distance and travel speed of the user is estimated, with a given margin, depending on the distance between base stations, and/or the amount of change in the radio signals, at given time intervals (for example, every five minutes) after the evaluation that the user is traveling.

Moreover, in the present embodiment the location information acquiring portion 144 is provided with a travel path recording portion, where this travel path recording portion is a module that calculates and records the travel path and travel speed based on the travel history of individual users or objects, such as the current location of the user, the current location of another user, the coordinate location of an arbitrary object, and the like, acquired from the location information acquiring portion 144. The calculation of the travel path by the travel path recording portion can determine, for example, the travel path that is the shortest distance connecting between two adjacent points in a time series of the individual locations that are sampled, or can determine the path along a route between the two points through referencing geographical information.

The display data generating portion 146 is a module for generating display data for displaying on the displaying portion 13*a*. The display data is graphic data, or image data, text data, video data, or data generated through combining with audio or other data. In particular, the display data generating portion 146 in the present embodiment achieves the functions of a real display data generating portion for generating real display data that displays the current location of the user on the real map M1 based on the current location of the user, acquired by the location information acquiring portion 144, and of a virtual display data generating portion for generating virtual display data for displaying the character on the virtual map M2 corresponding to the current location of the user based on the current location acquired by the location information acquiring portion 144. The display process for the display data generated by the display data generating portion 146 is controlled by the display controlling portion 145.

For example, this display data generating portion 146 functions as a virtual map information generating portion for generating a virtual map M2, including coordinate information for characters of other users, fantasyized blocks, and the like, on the virtual geographical information corresponding to the geographical information of the real map M1, as depicted in FIG. 2, in accordance with the game progress by the game progress processing portion 141. The virtual map information generating portion acquires geographic elements and buildings, roads, railways, and the like, that are included in the real map M1 that is stored in the memory 15 or in the real map database 35*a* on the network, and also references mapping data that is stored in the memory 15 or in the game database 35*c*, to generate map information, as virtual objects (virtual display data), for the virtual world based on the map information for the virtual world that corresponds to the real map M1, and on characteristics of characters and objects, information regarding event processes, graphic information, and the like.

Note that while, in the present embodiment, the virtual map M2 is generated by the virtual map information generating portion on the smartphone 1 side, the virtual map M2 that corresponds to the geographical information of the real map M1 may be generated in advance or in real time by the virtual map information controlling portion 37 of the game server 3 and synchronized through the synchronization processing portion 142 through distribution to the individual smartphones 1 through the game data distributing portion 34.

The display controlling portion 145 is a module for executing control so as to display the real display data and the virtual display data, generated by the display data generating portion 146, with both of these display data, or selected display data, or a portion of one superimposed on the other, where the displaying portion 13*a* displays the real display data and the virtual display data following control by the display controlling portion 145. The display controlling portion 145 performs a function as a combining processing portion for combining the generated real display data and the virtual display data in order to display virtual objects superimposed on real map information. In the example depicted in FIG. 2, virtual objects such as forests, mountains, crags, and the like, are located at the coordinate locations (coordinate ranges) corresponding to buildings in the real map M1 that is real display data.

Additionally, the display controlling portion 145 in the present embodiment comprises a function as a path displaying portion. The path displaying portion is a module that displays, as a path on the real map M1 or the virtual map M2, the travel path of the applicable user, the travel path of another user, and/or the travel path of an arbitrary object, recorded by the location information acquiring portion 144. "Paths" in the present embodiment include blocks wherein virtual objects are displayed superimposed on real map information.

Specifically, points Tp are issued depending on the distance actually traveled by a user 10 on the real map M1, where a character C1 that corresponds to the user 10 travels on the virtual map M2 through spending of these points Tp, revealing blocks B0 that are adjacent to the path of travel. This block B0 constitutes a portion of the travel path, and appears in an inactive state on the real map along the travel path, and is transitioned into an active state in response to a selection operation by a user through a touch operation or a command input, or the like. In the present embodiment, the series of operations for placing into an active state, through user operations, a block B0 that had appeared in an inactive state is term "fantasyizing." In this fantasyizing, as depicted in FIGS. 7 (*a*) and (*b*), through a user touching a block B0, which is divided into a shape corresponding to a city block that is adjacent to the travel path, the block B0 that has been touched will be fantasyized (transferred into an active state), where various types of blocks B2 through B5 are displayed superimposed on the city blocks of the real map M1 in the virtual map.

Note that another method to display the path by the path displaying portion may be through coloration, with a given width, of a travel path that is determined by connecting, with the shortest distance between two adjacent points in time series order for each of the locations that have been sampled, for example, or through coloration, with a given width, of a path that is determined along a route between two points, through referencing geographical information. Moreover, in the display of the path by the path displaying portion, partitions or objects that are near to the travel paths of the individual users or objects, in the real map M1 or the virtual map M2, may be displayed in color, as a portion of the path.

The partitions may be displayed through coloration by block units such as partitioning administrative districts, city blocks, municipalities and prefectures, cities, towns and neighborhoods, or the like, based on actual geographical information and/or virtual geographical information. Even in coloration by the block unit, blocks that are in contact with a travel path that is determined by connecting the shortest distance between two adjacent points may be colored, or blocks that are in contact with paths that are determined along a route between two points, referencing geographical information, may be colored.

(Operation of the Game System)

The operation of the game system having the structure set forth above will be described next. In the present embodiment, a function is provided that causes travel of the character C1, and that records and displays travel paths and fantasyized blocks in accordance with points Tp that have been spent, through spending the points Tp acquired through user travel. Moreover, the location-based game progresses through accumulating points Tp, or enlarging the fantasyized region, as the result of generating event processes, such as monsters appearing in the fantasyized blocks, defeating those monsters, and the like. The various processes will be explained below.

(1) Game Progress Processes

In the location-based game according to the present embodiment, the basic concept of the game is that a character is caused to travel in a virtual world, by the object controlling function, linked to travel of the user in the real world, and blocks corresponding to the path of this travel are fantasyized. Given this, in the location-based game according to the present system, points Tp are issued in accordance with the travel distance of the user in the real world, where these points Tp are spent to move, in an augmented reality world or in a virtual world, the character C1 that corresponds to the user, or to fantasyize blocks that correspond to city blocks, or to generate events such as battles or the appearance of monsters in the fantasyized blocks, to thereby cause the game to progress.

That is, a point issuing portion 38 is provided in the game server 3, and is a module that issues points depending on the travel distance of the user 10, detected by the location information acquiring portion 144 on the smartphone 1 side. Here "points" is value information, having trading value, and is handled as a unit of virtual currency in the virtual world in the game. Additionally, in the present embodiment, processes for moving the character C1 in the virtual world, or effects that are obtained through travel of the character in the virtual world, such as, for example, effects that are commensurate with the character C1 actually walking, such as fantasyizing on the map, obtaining items, or the like, can be produced depending on the number of points. Note that issuing of points and progression of the game are executed cooperatively by the game progress processing portions 36 and 141, where the game progress processes and points are recorded in the user database 35b and the game database 35c.

Additionally, in the present embodiment, points are accumulated through the cumulative distance of travel of the user, the number of times that specific facilities on the map have been accessed, and the number of repeat visits to areas that have already been fantasyized. For example, as illustrated in FIG. 8, when a user 10 repetitively travels back and forth between his home (location A) and the building B1d of his workplace, through commuting, or the like, points Tp are applied depending on the frequency thereof, and the fantasyizing process, described above, becomes possible through spending these points Tp. That is, it becomes possible to spend the points Tp to fantasyize the blocks between location A and building B1d, where a block that has been fantasyized is touched to display that block superimposed on the real map. Moreover, in the present embodiment, points acquired in an area that has already been fantasyized can be used to remotely fantasyize even a block B0u in an area that has not yet been visited, as depicted in FIG. 9(a) through (c).

Note that, in the present embodiment, the color of the path of the commuting path will be more intense, and the state of the fantasyized block will be different, depending on the number of times the path has been traveled. Moreover, the number of times a specific facility (the building B1d in this case) has been accessed (the number of trips) is also counted by the path record, where points are issued depending on this count, enabling these points to be used to enable use of a variety of special events. These special events may be the ability to fantasyize a block that has not been visited, the ability to obtain a special item, or the like, through points that have been accumulated.

Moreover, in the present embodiment the states of blocks that have been fantasyized will transition depending on the amount of time that has elapsed and on the progress of the game. Specifically, as illustrated in FIG. 5 and FIG. 6, points Tp are issued depending on the distance of travel of the user 10, and these points Tp are spent to move the character C1, corresponding to the user 10, on the real map M1. Through this travel of the character C1, the blocks corresponding to the city blocks along the path of travel can be fantasyized through the user touching the screen (phase F1). At the time of this fantasyizing, points Tp are spent for each block. Additionally, the state of the fantasyized blocks will change as time elapses or as the game progresses, as illustrated in FIG. 6.

First, as the character C1 travels, the information for the real map M1 will be displayed as a blank map, as a block B1 in a non-tapped state, for the blocks that are adjacent to the path of travel. The block B1, in the non-tapped state, is fantasyized, such as the activated block B2, through a "current location tap" operation, touching the untapped block B1 (phase F1). Note that an unvisited block B6, which is away from the travel path, may also be fantasyized through spending points Tp, through a "remote block tap" operation wherein an unvisited block is touched (phase F6). Note that the unvisited block B6 that has been fantasyized through the remote block tap will have a different image displayed than when fantasyizing through the normal current location tap.

As time elapses, the activated block B2 that has been fantasyized will transition to an activated block B3, which has been upgraded to be in a "sparkling state," or the like, wherein vegetation, such as a forest, or the like, has grown (phase F2). Note that it is possible to cause a transition to this "sparkling state" immediately, without waiting for time to elapse, through the use of a special item such as an "accelerating agent," that can be obtained through spending points Tp. In this activated block B3 that has been upgraded to transition to the "sparkling state," it is possible to tap the block to execute an event process such as cutting wood in a forest or harvesting grain. Points or items can be obtained through a harvest event process, where the fantasyizing is resetted to transition into an inactive block B4 (phase F3). In the inactive block B4, fantasyizing is disabled for a given time interval, through prohibition of the tap operation for a prescribed time interval, in a state waiting for the time interval to elapse. Thereafter, when the prescribed time interval has elapsed, the inactive block B4 transitions to an activated block (non-tapped state) B5 (phase F4), enabling fantasyizing and growth again through a tap operation (phase F5). The state of the fantasyized block transitions in a cyclical sequence in this way, maintaining the game performance even for regions that have already been conquered.

(2) Points Issuing Process

FIG. 10 is a flowchart depicting the process in the points issuing process, described above, in the present embodiment. As depicted in this figure, during execution of the game program on the smartphone 1 of the user 10, a process for acquiring location information and a process for calculating travel speed are executed, either constantly or periodically, followed by reporting to the game server 3 (S101). Specifically, the location information acquiring portion 144 acquires, as location information, values detected by an acceleration sensor 16, travel of the current location of the user, latitude and longitude through GPS, base station measurement positioning through triangulation based on radio signal strength and base station information, changes in base station measurement positioning through Wi-Fi measurement positioning using a database that combines SSIDs (Service Set ID) and radio signal states for Wi-Fi and longitude/latitude information, as location information.

In the game server 3 that receives the notifications of the location information from the user terminal, the cumulative path of each user is recorded (S201), and the amount of travel (cumulative travel distance) is calculated and stored for each user. The recording of the cumulative path is continued until an amount of travel of at least a given value has been accumulated ("N" in S202), and when the amount of travel of at least the given value has been stored ("Y" in S202), a number of points that depends on that amount of travel is issued as value information (S203). The issued points are received through downloading, or the like, by the user on the smartphone 1 side (S102).

On the smartphone 1 side for the user, the character C1 may be moved on the virtual map M2 depending on the points received (S104), or those points may be saved. Additionally, if the user 10 continues to move, so that issuing of points is repeated ("N" in S103), so that at least a specific amount of points is accumulated ("Y" in S103), it becomes possible to use a special event, such as fantasyizing a block path that is adjacent to the path, or fantasyizing an unvisited block, or use in purchasing an item, or the like (S105). Special events can be selected and used depending on the number of points, or the user can select arbitrarily a special event that can be used, to be executed through a use request operation. The use request operation is carried out based on an event generation process that depends on the number of points.

When the user selects the use of an event, the event is deployed in accordance therewith, and through a touch operation by the user, fantasyizing of an adjacent block or unvisited block is carried out (S105), and the result of the operation is reported to the game server 3. When an event deployment notification is received by the game side, a process for progressing the game, based on the deployed event, is executed (S204). The issuing of points, described above, and the deployment of events through the accumulation and use of points, can be repeated ("N" in S106 and S205) until the game is ended ("Y" in S106 and S205).

(3) Various Game Modes

The various game modes that are executed by the event processing portion will be explained next. In the present embodiment, a "monster painting mode," a piggyback mode," and an "IRL friend mode" are provided.

(3-1) Monster Painting Mode

In the normal mode, the game is progressed depending on the amount of actual travel by the user, and thus when there are at locations wherein the user can himself/herself cannot go, or has no time to go, the game might not progress as the user desires. In the present embodiment, the entertainment value of the location-based game is improved through enabling the game to progress through a character (a proxy object) such as a monster that moves virtually, independent of the travel of the user.

This is a mode wherein a virtual proxy object AO, such as a monster, a mascot, a character, or the like, which is associated with the user, is moved virtually on the real map M1 following a prescribed algorithm, enabling travel on a real map, to augment the travel path, through replacing the user, even if the user is not actually moving in the real world. This monster painting mode, accompanying a case where one wishes to fantasyize a location to which the user himself/herself cannot move, causes a block to appear along the travel paths accompanying virtual travel of the proxy object and travel of the user himself/herself in the real world through acquiring virtual travel of the proxy object or travel of the user from when travel of the user is not detected, such as when the power supply of the terminal is OFF or when the application has not been launched.

Specifically, the proxy object controlling portion 143e causes virtual travel of a virtual proxy object AO, such as a monster, a mascot, a character, or the like, that is associated with the user, on the real map M1 following a prescribed algorithm. Here the "prescribed algorithm" may be one that selects the shortest path to a location or event indicated by a user, selects a course for exploring an area that the user has not yet visited, or the like.

Describing in more detail, as depicted in, for example, FIG. 16(a), the user 10a may execute a releasing operation, at his or her current location, to launch a proxy object autonomous action event, where the proxy object AO begins to move autonomously, to follow arbitrary paths (for example, the path R11) in accordance with the prescribed algorithm, to move to arbitrary locations (location B in the figure), and then to follow the path R12, as depicted in (b) in this figure, to return to the current location of the user or to a coordinate that has been set as the user home. The location, on the map information, of the proxy object may be caused to travel automatically, in accordance with the progress of the game, by the game progress processing portion 36 or a proxy object controlling portion 143e and is linked to the current location of a specific user, and may be caused to travel automatically in accordance with a prescribed algorithm.

Additionally, this proxy object is able to execute recording of a travel path in place of the user that is its owner. That is, for the proxy object as well, the proxy object controlling portion 143e calculates the travel path and travel speed, and records them as the travel path, based on the current location of the user, acquired by the location information acquiring portion 144, and the history of travel under control of user operations or the game server 3. The calculation of the travel path by the proxy object controlling portion 143e can determine, for example, the travel path that is the shortest distance connecting between two adjacent points in a time series of the individual locations that are sampled, or can determine the path along a route between the two points through referencing geographical information. Additionally, the travel path by the proxy object AO, recorded and calculated by the proxy object controlling portion 143e, is passed to the travel path updating portion 143c, to be added to the travel path of the user himself/herself. A graphic wherein the proxy object AO or character C1 moves in accordance with this travel path is generated by the display data generating portion 146 and displayed by the display controlling portion 145, and operations for fantasyizing blocks that appear through the addition of this travel path, and game operations such as battles with monsters that appear in the fantasyized blocks, are carried out.

The autonomous action events of the proxy object, referenced above, will be explained here. FIG. 16 is an explanatory diagram of an autonomous action event of a proxy object according to the present invention and FIG. 17 is a flowchart depicting the operating processing for an autonomous action event of the proxy object. Here, an example will be explained wherein, as depicted in FIG. 16, the user 10*a* releases the proxy object AO at a location A that is the current location, and after moving to a location B based on control of the game server 3, it returns to the location of the user 10*a* who is at location A. Note that FIG. 16 depicts a state wherein the user 10*a* is displayed as the character C1.

The user 10*a*, at the current location, executes, on the smartphone 1*a*, an operation for releasing the proxy object AO (S501). Here, as depicted in FIG. 16(*a*), the user 10*a* releases the proxy object AO at location A. Through releasing the proxy object AO, an autonomous action event for the proxy object AO is generated on the smartphone 1*a*. Specifically, the location information acquiring portion 144, based on the user operation, selects as a monitored object, the proxy object AO that is set in an arbitrary location on the real map M1 or the virtual map M2, and the game progress processing portion 36 or 141 generates an autonomous action event that automatically moves the coordinate location of the proxy object AO on each map information following the prescribed algorithm.

Following this, a proxy object release notification is sent to the game server 3 side through generation of this autonomous action event. The game server 3 that has received the proxy object release notification records the generation of the proxy object event (S601), and commences travel control of the proxy object AO (S602). Through this, the proxy object AO is moved automatically independently. Note that here the user path through location B follows the path R12 to return to the location A, and the proxy object AO is moved while exploring an area that has not been visited by the user 10*a*, through the round-trip paths R11 and R12. The travel of the proxy object AO is recorded as travel history and sent, as location information travel history, to the smartphone 1*a* (S603), where the location information of the proxy object AO is updated on the smartphone 1*a*, enabling displaying as a path on the map (S502).

In this step S502, the travel path of the proxy object is recorded and calculated by the proxy object controlling portion 143*e*, where the calculated travel path by the proxy object AO is passed to the travel path updating portion 143*c*, and added as a travel path of the user himself/herself. A graphic wherein the proxy object AO for the character C1 moves along this travel path is generated by the display data generating portion 146, to be displayed by the display controlling portion 145, and operations such as fantasyizing of blocks that appear through the addition of the travel path, and game operations such as battles with monsters that appear in the fantasyized blocks, are performed (S503). In the battles that are generated by the travel path of the proxy object AO, the operations that can be executed, and the effects of those operations, are set so as to be different.

Thereafter, as depicted in FIG. 16(*b*), when the proxy object AO returns to the location of the user, a process for terminating the travel control of the proxy object AO is executed by the game server 3 (S604), and a notification is sent to the smartphone 1*a* side that the proxy object event has been completed (S605). The smartphone 1*a* side, upon receipt of this notification, terminates the proxy object event (S504).

(3-2) Piggyback Mode

The piggyback mode is a game progress system wherein one user synchronizes his/her own travel with the travel of another user, to consign his/her game progress to the other user. In the piggybacked state wherein game progress is consigned to another user, the processes through the travel of the other user are executed, on the piggybacked side, it were travel by the user himself/herself, and graphics are displayed, maps are scrolled, and fantasyizing is performed depending on the travel of the other user.

Specifically, when the game is progressed linked with another user, then when the user and the other user are in a state wherein they are present within a prescribed communication area, the link authenticating portion 143*a* detects confirmation operations by the user and the other user, and when there has been mutual approval, one user consigns game progress to the other user, that is, the commencement of the piggyback mode is confirmed.

When authentication by the link authenticating portion 143*a* has been completed, the link executing portion 143*b*, based on prescribed conditions, executes a process for linking with another user. The travel path updating portion 143*c* is then able to receive, as its own travel path, in addition to, or instead of, the travel path of the local terminal, the path moved by another user, acquired by the other-user location information acquiring portion 143*d*. This linked process reflects, into the travel path of the local terminal, the travel of another user, even in a state wherein the travel of the user cannot be detected, such as when the power supply is OFF, or when the application has not been launched. Note that when the piggyback mode is running, if the current location of the other user is in proximity to the current location of the local terminal, within a prescribed distance, the display regarding the current location of the other user will be restricted.

The "piggyback mode event" wherein one's own game progress is consigned to another user will be explained here. FIG. 18 is an explanatory diagram depicting a piggyback mode event according to the present embodiment, and FIG. 19 is a flowchart depicting the operating processes in the piggyback mode event. Here an example will be explained wherein the user 10*a* consigns his/her own game progress (formation of the travel path) to a user 10*b*, and the piggyback mode is cleared at the destination of the user 10*b*. Note that FIG. 18 depicts a state wherein the user 10*a* is displayed as the character C1, and the user 10*b* is displayed as the character C2.

As depicted in FIG. 19, the user 10*a* executes, on his/her own smartphone 1*a*, an operation to request the piggyback mode from the user 10*b* (S801). Here, as depicted in FIG. 18(*a*), the user 10*a* requests the piggyback mode from the user 10*b* at location A. An operation for approving the piggyback mode is performed on the smartphone 1*b* of the user 10*b* who has received this request operation (S901). Through this, the piggyback mode consigning/consigned events are generated on the smartphone 1*a* and the smartphone 1*b*.

Specifically, the smartphone 1*a* side location information acquiring portion 144 acquires, and selects as the coordinate location of the object being monitored, the current location of the smartphone 1*b* in the real world, and the game progress processing portion 36 or 141 sets the piggyback mode starting location based on the current location of the user 10*b*, to generate a consignment event wherein the location of the user 10*a* is moved automatically according to the travel of the user 10*b*, based on the travel of the smartphone 1*b* and controlled by the game server 3.

Through the generation of this consignment event, a proxy object consigning notification or consigned notification is transmitted to the game server 3 side (S802). This notification may be sent as a consigning notification from the smartphone 1*a* that is on the side that is consigning, or may be sent as a consigned notification from the smartphone 1*b* on the side that has received the consignment, or consigning and consigned notifications may be sent from both the smartphones 1*a* and 1*b*. The game server 3 that has received these notifications record, in a database, that a piggyback mode consignment event has been generated (S701). Moreover, in this case, together with the registration of the piggyback mode consignment event generation, location information synchronization, in order to set the piggyback mode starting location, is carried out as an initialization process between the smartphone 1*a* and the smartphone 1*b* (S803).

Thereafter, the user 10*b*, to which the piggyback mode has been consigned, moves to an arbitrary location, through activity that is separate from that of the user 10*a*. Given this, the current location of the smartphone 1*b*, which is the location arrived at by the user 10*b*, will always be reported to the game server side 3 until the piggyback mode is released (S902, and N in S903). During this interval, the game server 3 receives the travel notifications from the smartphone 1*b*, to update the location information in the piggyback mode in the database (S702), and to transmit, to the smartphone 1*a* side, notifications of updated location information (S703).

In the smartphone 1*a*, which has received the notification of the travel notification in Step S703, updates the location information for the local terminal in the piggyback mode, to synchronize information with the game server 3 side (S804, and N in S805). Through this, the travel of the proxy object AO is recorded as travel history on the game server 3 side, and also the location of the local terminal in the piggyback mode, that is, the current location and the travel path of the actual smartphone 1*b*, can be displayed on the map on the smartphone 1*a* side as well. Note that the travel notification of this user terminal may instead be transmitted directly from the smartphone 1*b* to the smartphone 1*a* in order to synchronize between the smartphone 1*a* and the smartphone 1*b*. While this piggyback mode is running, a process is carried out on the smartphone 1*a* side so as to display, through map scrolling, graphics, and the like, the state with which the smartphone 1*b* is moving.

Note that when the piggyback mode is running, if the current location of the other user is in proximity to the current location of the local terminal, within a prescribed distance, the display regarding the current location of the other user will be restricted. Describing this in more detail, as depicted in FIG. 20, if the current location of the other user (for example, the user on the piggybacked side) and the current location of the local terminal (the user on the side that is performing the piggybacking) are in proximity within a prescribed distance (within an area A10 with a prescribed radius centered on the user 10*b*), or if the user on the side that is performing the piggybacking enters into a prescribed area that is set by the side of the user that is piggybacked, the display restricting portion 143*g* and the game server 3 will restrict the display regarding the current location of the other user (the user on the piggybacked side).

The settings for restricting the display can be set arbitrarily by the user on the side that is being piggybacked, and it is possible to set the locations (latitude/longitude, political district unit such as administrative district, city block, municipality, prefecture, city, town, neighborhood, or the like), or time bands, or distance from the local terminal to be restricted, and also possible to set permissions for allowing displaying only when arbitrary locations or times are set, such as for, for example, during recreational travel or while events are being held, with the display prohibited otherwise. In this display restricting system, in order to prohibit displaying location information on the real map or the virtual map, and to prohibit imaging and graphic displays of the surroundings, and to not provide, to the other party, one's current location in real time, a time difference (such as, for example, a lag of several hours) may be set arbitrarily for providing information to the other party, where settings for these display restrictions can be selected or combined arbitrarily through user operations. When a time lag for displaying the current location is set, the timing of the recording of the travel during Step S902 may be delayed, or the timing of the updating, and the notification thereof, of the location information of the piggyback mode by the game server 3, at the time of Step S702 or S703, may be delayed.

Additionally, when, at an arbitrary location, the user 10*a* or the user 10*b* executes, on the smartphone 1*a* or 1*b*, an operation for releasing the piggyback mode (Y in S805 or S903), the terminal that has performed the releasing operation transmits a notification to that effect to the other terminal and to the game server 3. The game server 3 that has received the piggyback mode releasing notification executes a process to terminate the piggyback mode event (S704), and provides notification to the smartphone 1*a* and 1*b* side that the piggyback mode event has been terminated (S705). On the smartphone 1*a* and 1*b* side, which have received this notification, the piggyback mode event is terminated (S807 and S905).

(3-3) IRL Friend Mode

The IRL friend mode is a mode that enables consignment of game progress or linking between users that have a relationship wherein there is confidence in terms of security as well, such as between family members and friends, and the like. This IRL friend mode is an accompanying mode wherein when two people, such as family members or close friends travel on an identical path, the sizes or numbers of blocks that are fantasyized are increased, the travel speed is increased, and the attack power in battles is increased. In the accompanying mode, a linking process is executed if the current location of another user and the current location of the local terminal are in proximity within a prescribed distance and the travel path of the local terminal and the travel path of the other user match each other. Additionally, in the IRL friend mode, there is a consignment mode where one user synchronizes his or her travel with the travel of another user who has a close relationship, such as a family member or friend, and consigns his or her own game progress to the other user. In this IRL friend mode, execution of consignment and accompanying modes is allowed based on confirmation operations by the user and the other user in a state wherein the user and the other user are within a prescribed communication area, such as the identical Wi-Fi area or a short-range network such as Bluetooth.

(3-3-1) IRL Friend Accompanying Mode

Here the "IRL friend accompanying mode," which is one of the "IRL friend mode events," wherein two individuals, who are family members or close friends, travel on the same path, will be explained. FIG. 21 is an explanatory diagram depicting the IRL friend accompanying mode according to the present embodiment, and FIG. 22 is a flowchart depicting the operating processes in the IRL friend consignment mode event. Here an example will be explained wherein a user 10a and a user 10b, who are members of the same family, accompany each other on the same path to cause the game to progress. Note that FIG. 21 depicts a state wherein the user 10a is displayed as the character C1, and the user 10b is displayed as the character C2.

In more detail, while in the normal mode the user 10a moves independently, as depicted in FIG. 21(a), in the IRL friend accompanying mode, as depicted in (b) in this figure, when two people, who are family members or close friends, move along the same path, the sizes or numbers of blocks that are fantasyized are increased, the travel speed is increased, and the attack power in battle is increased. In the accompanying mode, a linking process is executed if the current location of another user and the current location of the local terminal are in proximity within a prescribed distance and the travel path of the local terminal and the travel path of the other user match each other.

Specifically, as depicted in FIG. 22, if, for example, the user 10a and the user 10b are both within a communication area, such as the same Wi-Fi area within a building, or within the communication area of the same Bluetooth short range network, or the like, and the user 10a and the user 10b perform confirmation operations to enable execution within the communication network NA, they can set each other as "IRL friends," to enable execution of consignment or accompanying modes for IRL friends only. Here, for example, a smartphone 1 that can connect in a location A, such as a communication area NA for Wi-Fi, or the like, is used to connect to a communication network (Step S1100), to enable use in the IRL friend mode. Note that a prescribed communication area NA may be an identical Wi-Fi network, a short range network using Bluetooth, or the like, or may be a range wherein infrared signals or signals through audio can be sent and received.

Given this, in the communication area NA, the user 10a and the user 10b each executes, on his/her own smartphone 1a, an operation to confirm each other as IRL friends (S1101, S1201). Here, as depicted in FIG. 21(b), at location A the user 10a and the user 10b confirm each other as IRL friends. Through this, the IRL friend confirming process is commenced on the smartphone 1a and the smartphone 1b.

Specifically, in each of the smartphones 1a and 1b, the location information acquiring portion 144 acquires the current location in the real world, and the game progress processing portion 36 or 141 establishes an IRL friend through setting the IRL friend mode starting location based on the current location of the user 10a and the user 10b.

An IRL friend confirmation notification is transmitted through confirming the IRL friend (S1102). This notification may be sent from either the smartphone 1a or the smartphone 1b, or may be sent from both the smartphone 1a and the smartphone 1b. The game server 3 side that has receives these notifications records in a database that an IRL friend mode accompanying event has been generated (S1001). Moreover, in this case, along with recording that an IRL friend accompanying event has occurred, location information synchronization, for setting the IRL friend mode starting location is carried out as an initialization process between the smartphone 1a and the smartphone 1b (S1103).

Following this, the users 10a and 10b for which an IRL friendship has been established, accompany each other and travel to an arbitrary location. Given this, the current location, which is the location to which the users 10a and 10b have arrived, will always be reported to the game server 3 side until the distance between the users 10a and 10b becomes separated (S1202, and Y in S1203, S1104, and Y in S1105). During this time period, the game server 3 receives travel notifications from the smartphone 1a or 1b, to update the location information for the IRL friend mode in the database (S1002).

While the accompanying mode is in progress, the sizes or numbers of blocks that are fantasyized is increased, the travel speed is increased, and the attack power in battle is increased. Additionally, when the user 10a and the user 10b separate from each other to arbitrary locations (N in S1105 or S1203), a notification to that effect is sent from one of the terminals to the game server 3 (S1106 and S1204). The game server 3 that has received the separation notification executes a process to terminate the IRL friend mode event (S1003), and notifies the smartphone 1a and 1b side that the IRL friend mode event has been terminated (S1004). The smartphone 1a and 1b side, which has received this notification, terminates the IRL friend mode event (S1107 and S1205). Note that while here a separation notification from the smartphone 1 side to the game server 3 side was used, instead the distance between the smartphones 1 may be monitored by the game server 3, and the event termination process may be executed autonomously by the game server 3 if there is separation thereof beyond a prescribed distance.

(3-3-2) IRL Friend Consignment Mode

The "IRL friend consignment mode," which is one of the "IRL friend mode events," wherein one's own travel is consigned to the travel of another user who has a close relationship, such as a family member or a friend, will be explained. FIG. 23 is an explanatory diagram depicting the IRL friend consignment mode according to the present embodiment, and FIG. 24 is a flowchart depicting the operating process for the IRL friend consignment mode event. Here an example will be explained of a case wherein a user 10a consigns his/her own game process (formation of a travel path) to a user 10b that is a member of the same family. Note that FIG. 23 depicts a state wherein the user 10a is displayed as the character C1, and the user 10b is displayed as the character C2.

As depicted in FIG. 23, if, for example, the user 10a and the user 10b are both within a communication area, such as the same Wi-Fi area within a building, or within the communication area of the same Bluetooth short range network, or the like, and the user 10a and the user 10b perform confirmation operations to enable execution within the communication network NA, they can set each other as "IRL friends," to enable execution of consignment or accompanying modes for IRL friends only. Here, for example, a smartphone 1 that can connect in a location A, such as a communication area NA for Wi-Fi, or the like, is used to connect to a communication network (Step S1400 in FIG. 24), to enable use in the IRL friend mode. Note that the "prescribed communication area NA" includes being in the same Wi-Fi network, the same short-range network such as Bluetooth, or a range wherein authentication through transmission and reception of infrared signals or audio signals is possible, or an extremely short-range wherein actions such as shaking the terminals are performed simultaneously, or the like, and may also be out-of-doors.

Given this, as depicted in FIG. 24, in this communication area NA, the user 10a executes, on his or her own smartphone 1a, an operation to request the IRL friend mode from the user 10b (S1401). Note that if it cannot be confirmed that both users are in the communication area NA, an error display will be performed, and a message may be outputted suggesting the "piggyback mode," which is another mode, or processing may transfer automatically to the process for confirming the "piggyback mode," described above. Here, as depicted in FIG. 23(*a*), at location A the user 10*a* requests the IRL friend mode of the user 10*b*. An operation for approving the IRL friend mode is performed on the smartphone 1*b* of the user 10*b* who has received this request operation (S1501). Through this, the IRL friend mode consigning/consigned events are generated on the smartphone 1*a* and the smartphone 1*b*.

Specifically, the smartphone 1*a* side location information acquiring portion 144 acquires, and selects as the coordinate location of the object being monitored, the current location of the smartphone 1*b* in the real world, and the game progress processing portion 36 or 141 sets the IRL friend mode starting location based on the current location of the user 10*b*, to generate a consignment event wherein the location of the user 10*a* is moved automatically according to the travel of the user 10*b*, based on the travel of the smartphone 1*b* and controlled by the game server 3.

Through the generation of this consignment event, a proxy object consigning notification or consigned notification is transmitted to the game server 3 side (S1402). This notification may be sent as a consigning notification from the smartphone 1*a* that is on the side that is consigning, or may be sent as a consigned notification from the smartphone 1*b* on the side that has received the consignment, or consigning and consigned notifications may be sent from both the smartphones 1*a* and 1*b*. The game server 3 side that has receives these notifications records in a database that an IRL friend mode consignment event has been generated (S1301). Moreover, in this case, along with recording that an IRL friend consignment event has occurred, location information synchronization, for setting the IRL friend mode starting location is carried out as an initialization process between the smartphone 1*a* and the smartphone 1*b* (S1403).

Thereafter, the user 10*b*, to which the IRL friend mode has been consigned, moves to an arbitrary location, through activity that is separate from that of the user 10*a*. Given this, the current location of the smartphone 1*b*, which is the location arrived at by the user 10*b*, will always be reported to the game server side 3 until the IRL friend mode is released (S1502, and N in S1503). During this interval, the game server 3 receives the travel notifications from the smartphone 1*b*, to update the location information in the IRL friend mode in the database (S1302), and to transmit, to the smartphone 1*a* side, notifications of updated location information (S1303).

In the smartphone 1*a*, which has received the notification of the travel notification, updates the location information for the local terminal in the IRL friend mode, to synchronize information with the game server 3 side (S1404, and N in S1405). Through this, the travel of the proxy object AO is recorded as travel history on the game server 3 side, and also the location of the local terminal in the IRL friend mode, that is, the current location and the travel path of the actual smartphone 1*b*, can be displayed on the map on the smartphone 1*a* side as well. Note that the travel notification of this user terminal may instead be transmitted directly from the smartphone 1*b* to the smartphone 1*a* in order to synchronize between the smartphone 1*a* and the smartphone 1*b*. While this IRL friend mode is running, a process is carried out on the smartphone 1*a* side so as to display, through map scrolling, graphics, and the like, the state with which the smartphone 1*b* is moving.

Additionally, when, at an arbitrary location, the user 10*a* or the user 10*b* executes, on the smartphone 1*a* or 1*b*, an operation for releasing the IRL friend mode (Y in S1405 or S1503), the terminal that has performed the releasing operation transmits a notification to that effect to the other terminal and to the game server 3. The game server 3 that has received the IRL friend mode release notification executes a process to terminate the IRL friend mode event (S1304), and notifies the smartphone 1*a* and 1*b* side that the IRL friend mode event has been terminated (S1305). The smartphone 1*a* and 1*b* side, which has received this notification, terminates the IRL friend mode event (S1407 and S1505).

(4) Group Input Operation Process

The group input process at the time of an event will be explained next. In the present embodiment, if, for example, a monster M0, or the like, that is present in a fantasyized block, is nearby, the game progress processing portion 141 executes an event process such as a battle, or the like, when the monster is encountered.

In the game progress processing portion 141 according to the present embodiment, an input interface controlling function is provided for performing, as single operations or group-completed operations, operations that should actually be inputted individually, for each monster during an event process when an event process is generated through an encounter with monsters when passing through an event generating region. In this game progress processing portion 141, normally individually inputted steps are executed wherein input of user operations is received individually for each of a plurality of the individual applicable process (such as monsters M0, or the like) that appear in standard event processes; however, based on a selection operation by the user, instead of individual input steps, a group-completion operation step is provided wherein it is possible to input a single group-completion operation for processing, in a group, a plurality of monsters. When processing all of the plurality of monsters, the game advances with the event processing carried out through inputting of this group-completion operation.

The event processing portion 143 of the game progress processing portion 141 according to the present embodiment comprises an event execution processing portion 143*h* for progressing the game through performing the event process when a user operation is inputted correctly. The user operation acquired by the event execution processing portion 143*h* is a path inputting operation wherein a path is drawn on the touch screen, and the event processing portion 143 performs an event process based on the shape of the path that is drawn in the path inputting operation, and on the position relative to a virtual object.

Here, the individual inputs that are normally performed, as described above, include also the path inputting operations that are inputted for each individual monster M0 that appear in the battle, where the path input operation may be a slash operation Ac1 wherein a diagonal line is inputted rapidly on the touch panel, as depicted in FIG. 12(*a*), for example. The monster M0 is an object that moves relative to the background Bg in virtual space, and through displaying the same so as to move relative to the background Bg, it is caused to appear as moving around in the virtual space, where the slash operation Ac1 is depicted as the user-operated character attacking with a sword that swings down toward the monster M0.

Given this, the damage that is inflicted on the monster M0 is determined depending on a variety of parameters, such as the location, timing, direction, and shape drawn by the line that is the path of the slash operation Ac1, and whether or not it contacts the monster M0 that is the target of the event process, and the like. Moreover, in the slash operation Ac1 according to the present embodiment, as depicted in FIG. 12(b), through maintaining a so-called "long-push" state with the state wherein the screen is touched standing still at the same place when drawing the slash, a direction is given to accumulate energy depending on how long the touch remains still, and damage is inflicted to the monster M0 depending on the amount of energy that has been accumulated. As depicted in FIG. 13, the path input operation may include a method wherein a sign Ac2 is inputted, depending on the type of monster M0 or the current location of the user, through drawing text, a symbol, a graphic, or the like, such as a circle, an X, a triangle, or the like, on the touch panel, such as a sign or an action when a magical spell is to be cast.

Note that in the present embodiment, in these path inputting operations, instruction may be given that will reduce the damage by the monster M0 through the path inputting operation by producing a change in the defensive behavior, endurance, or the like, of the monster M0, through changing the displayed image or adding an object, such as the monster M0 holding a shield, setting up a barrier, or the like. Moreover, depending on the effect of the path inputting operation, the direction may be to reduce a parameter such as the physical strength or magical power of the character, to consume points Tp, or to reduce the time limit.

Moreover, in the present embodiment, in a battle event process (a battle game with an enemy character such as a monster that appears in virtual space), wherein the path inputting operation is performed, the form of the path that is inputted (the command) through the operation for inputting the path may be different depending on the position of the slash operation on the screen, the timing with which it is inputted, the direction and shape of the path, and the location information of the user. Specifically, the event execution processing portion 143h acquires the current location of the local terminal from the location information acquiring portion 144 or the external travel record acquiring portion 143f, reads out, from the memory 15, scenario data for events generated or deployed through various types of path inputting operations, and executes the events depending on the scenario data while referencing scenario data corresponding to the current location. In a form that is linked with another user, the event execution processing portion 143h sends an inquiry to the link executing portion 143b, to acquire the status of another user that is currently linked (level, number of points, travel distance, and length of time of continual linkage between the users), to determine the current linked form.

Here, the scenario data that is referenced is a program or data that describes the branching or evolution of the game progress, and is tabular data assigning a correspondence of the branching or evolution of the game progress with the path input operation (command), location information, and form of the link with the other user. The event execution processing portion 143h references the table data based on the path operation inputted by the user, the location information such as the current locations of users (including other users), and the form of the link, acquired from the link executing portion 143b (the status of the other user, etc.), to select and determine the next event to be generated, the effects of an inputted command, and the evolution of an event that is being generated.

For example, depending on the current location of the user, the commands that can be used may be changed from "Your Items" to "Your Spells," where the scenario data that is associated with the current location is read out, and the command inputs (the signs or actions depending on the inputted path) will change accordingly, so as to change the events that are deployed through inputting of a correct command. Moreover, as described above, the scenario data described above is referenced to also change the signs or actions that should be inputted in the path inputting operation depending on the virtual proxy objects associated with the user, and the form of linkage with the other user if in the "monster painting function," or "piggyback mode," or "IRL friend mode," described above.

Moreover, the effects of a command, such as the use of an item, a spell, or the like, that is executed through a path inputting operation, will differ depending on the location information for the user, the virtual proxy object associated with the user, and the form of linkage with another user. For example, when executed in the piggyback mode, the effect of a command that is inputted, or the shape of the path that can be inputted, will be different depending on the totals of, or differences between, or the like, the statuses, number of points, experience values, and cumulative accompanied distance, and the like, between the user that is performing the piggybacking and the user on the piggybacked side, and on the form of the linkage at that time. Furthermore, in the IRL friend accompanying mode, described above, the shape of the path that is to be inputted, or the effects of the inputted command, may be different depending on the form of the linkage with the other user, such as the status, or number of points, or the like, of the accompanying user.

On the other hand, as a group-completion operation, the operation may be one wherein the smartphone 1 is tilted, for example, as depicted in FIG. 14, so as to move the monsters off the screen all at once, or an operation wherein the monsters are shocked to death en masse through shaking the smartphone 1, or an operation wherein a noise is generated through the pressure of an airflow on the microphone by blowing toward the microphone. Note that life points or levels are set, as threshold values that are required to complete the process, for each of the plurality of monsters that are to be subjected to the process, where only those monsters wherein the threshold value is no greater than a prescribed value will be beaten by the group operation input, with individual inputs, described above, required for those monsters that exceed the specific threshold value. As a group-completion operation, as depicted in FIG. 15, a path inputting operation such as a slash operation Ac1 may be performed, as described above, on a monster M0 that is displayed superimposed on the real map M1. In this case, it is possible to set conditions such as so as to activate a fantasyized block B0 through performing an event process such as defeating a monster M0 where a monster M0 is displayed on a fantasyized block B0 in an inactive state when, for example, the fantasyized block B0 appears in an inactive state on the real map M1.

Note that in the present embodiment, in this group completion operation, instruction may be given that will reduce the damage by the monster M0 through the path inputting operation by producing a change in the defensive behavior, endurance, or the like, of the monster M0, through changing the displayed image or adding an object, such as the monster M0 holding a shield, setting up a barrier, or the like. Additionally, for the individual monsters M0, there may be those that are defeated and those that survive, depending on the constitutions thereof. Moreover, depending on the effect of the path inputting operation, the direction may be to reduce a parameter such as the physical strength or magical power of the character of the user, to consume points Tp, or to reduce the time limit.

Moreover, through actions such as blowing with one's breath, tilting the smartphone 1, or the like, when inputting a path in the individual input operation or the group-completion operation, described above, it is possible to direct that the number of monsters M0 be reduced, that the endurance/defensive strength thereof be reduced, or that other parameters be decreased or increased, and when performing individual input operations on the surviving monsters M0 thereafter, path inputting operations may be carried out in respect to the parameters that have been decreased or increased.

Additionally, the individual input operations or group-completion operations described above may be executed only while moving in the real world, or may be executed only while standing still.

This group input operating process will be explained in detail. FIG. 11 is a sequence diagram showing the operations regarding the event processes. First, as the game advances, location information is acquired by each individual smartphone 1 periodically, and transmitted to the game server 3 (S401 and S301). On the game server 3 side, points are issued according to the distances of travel that have been transmitted for each of the users (S302), and the issued points are transmitted to the smartphone 1 side and applied to the user (S303). On the smartphone 1 side, the points that have been applied are received, and the points can be used, based on a user operation, to move the character C1 on the virtual map, to fantasyize a block, or the like (S402).

Additionally, when a battle event process has been generated ("Y" in S403), and the user has selected group processing ("Y" in S404), the individual processes are skipped, and the event progresses as a group-completion operation. Moreover, if the user has not selected group processing, then, as is normal, the standard individual inputs are requested (S406). Note that while here the execution of group processing is possible through an arbitrary selection operation by the user, the speed of travel of the current location of the smartphone 1 may be acquired instead by the location information acquiring portion 144 on the smartphone 1 side, for example, with group processing executed forcibly on event processes when the speed of travel of the user is greater than a prescribed value. In this case, the game progress processing portion 141, for a group processing-compatible event, forcibly selects the group-completion operation instead of a plurality of standard operations, to cause the progression of the game by completing the battle through omitting the individual input operations. In this case, if the speed of travel of the user is greater than the prescribed value, the levels of the monsters that appear in the battle may be reduced, so as to increase the success rate of the group completion.

On the one hand, through group processing ("Y" in S404), when all monsters have been beaten ("Y" in S405), the event process has been performed, so the game progress processing portion 141 on the game server 3 side is performed through the synchronization processing portion 142 (S407), and the synchronization process is performed on the game server 3 side (S304), where the result of the event process that has been executed is reflected in the game progress processes thereafter (S305). On the other hand, when group processing was not selected in Step S404 ("N" in S404), or not all of the monsters were beaten in the group processing ("N" in S405), then individual standard inputs are received (S406), and the battle develops and is executed as normal. After the battle has been completed, the result is transmitted to the server side, to perform a synchronization process (S407), and, at the game server 3 side that has received the notification, the synchronization process is performed (S304), and the results of the battle are reflected in the game progress processing thereafter (S305). The processes described above are repeated ("N" in S408) until the game is ended, and when a game process operation is performed ("Y" in S408), the game is terminated.

Operations and Effects

As described above, the present embodiment makes it possible to cause a game to progress through causing a virtual proxy object AO that is associated with a user to move virtually on a real map M1 following a prescribed algorithm in a location-based game wherein the game is progressed in a virtual world correlated with the distance moved by a user in the real world, enabling the game to progress automatically even for locations that the user himself/herself cannot go, or has no time to go. The proxy object, in the present embodiment, is acquired automatically by the OS-side location information acquiring portion 17*b* that is provided on the OS side in the smartphone 1, or by the location information controlling portion 32 on the game server 3 side, and thus the game can be progressed automatically, even when the game application has not been launched, or when the power supply of the smartphone 1 is OFF.

Moreover, the present embodiment is provided with a "piggyback function," that enables one's own game to be progressed by reflecting, into the progress of one's own game, travel of another user, and enables the game to be progressed while engaging in communication with another user through the "piggyback function."

Moreover, the present embodiment enables consignment of travel to another user, or travel accompanied by another user, through the "IRL friend function" that executes a linking process where the travel path of one user matches the travel path of another user, or when the users are in a prescribed communication area. This makes it possible to change the effects of fantasyizing, and the items and attack strengths in a battle event, when accompanied by a user who is a friend, or when there is a consignment to a family member, or the like, enabling an improvement in the entertainment value of the game through providing opportunities for communication with other users through increasing the game score or enhancing the progress when in communication with another user.

Moreover, the present embodiment provides an "IRL friend function" that executes a linking process when the travel path of one user matches the travel path of another user, or they are in a prescribed communication area, enabling the game to be progressed by establishing communication through having a significant relationship of the travel of a user in the game with that of another user, thereby improving the entertainment value of the game through a greater variety in gameplay.

The present embodiment can improve the entertainment value of the game to the ability to achieve an increase in the variety of operations in event processes such as battles, or the like, that are generated during the game, through the ability to input commands using slashes that are drawn in contact with virtual objects, or text or graphics, depending on the current location of the user, in order to cause event processing to be carried out based on the shape of the path that is drawn, and the location relative to the virtual object, through inputting a user operation wherein a path is drawn on a touch screen in a game such as one wherein standard event processes are performed sequentially, such as a role-playing game.

EXPLANATIONS OF CODES

A0: Replacement Object
B0: Block
B0u: Block
B1: Untapped Block
B2: Activated Block
B3: Upgraded Activated Block
B4: Inactive Block
B5: Activated Block (Non-Tapped)
B6: Unvisited Block
B1d: Building
C1, C2: Characters
M0: Monster
M1: Real Map
M2: Virtual Map
Tp: Point
1 (1a, 1b): Smartphone
2: Internet
3: Game Server
10: (10a,10b): User
11: Communication Interface
12: Input Interface
12a: Touch Panel
13: Output Interface
13a: Displaying Portion
14: Application Executing Portion
15: Memory
16: Acceleration Sensor
17: CPU
17a: Operating System
17b: Operating System-Side Location Information Acquiring Portion
21: Satellite
22: Wireless Base Station
31: Communication Interface
32: Location Information Controlling Portion
33: Authenticating Portion
34: Game Data Distributing Portion
35a: Real Map Database
35b: User Database
35c: Game Database
35d: Point Database
36: Game Progress Processing Portion
37: Virtual Map Information Controlling Portion
38: Point Issuing Portion
141: Game Progress Processing Portion
142: Synchronization Processing Portion
143: Event Processing Portion
143a: Link Authenticating Portion
143b: Link Executing Portion
143c: Motion Path Updating Portion
143c: Travel Path Updating Portion
143d: Other-user Location Information Acquiring Portion
143e: Proxy Object Controlling Portion
143f: External Travel Record Acquiring Portion
143g: Display Controlling Portion
143h: Event Execution Processing Portion
144: Location Information Acquiring Portion
145: Display Controlling Portion
146: Display Data Generating Portion

The invention claimed is:

1. An input interface system for a game wherein event processes that are generated accompanying user travel are executed sequentially, wherein the game is progressed in a virtual world based on points that are applied in correlation with travel distance of a user in a real world context, comprising:
a virtual display data generating portion configured to generate a virtual object in accordance with the progress of the game that accompanies movement of the user;
a compositing processing portion configured to display the virtual object so as to be superimposed on real map information;
inputting means for receiving inputting of a user operation in respect to the virtual object that appears in the event processing and a selection operation in respect to a block that has a planar shape corresponding to geographic information of the real world context, and that partially or entirely covers the real map; and
event execution processing means for progressing the game by defining the event process as having been executed when the user operation has been inputted correctly into the inputting means, wherein:
the virtual object includes the block;
the block appears in an inactive state on the real map as a portion of movement trajectory in conjunction with the movement of the user in the real world context and virtual movement of a proxy object, and transitions to an active state based on thee selection operation of the user;
the user operation is a path inputting operation wherein a path is drawn on a touch screen; and
in the event execution processing means the event process is executed based on a shape of the path that is drawn in the path inputting operation, and a relative positioning with respect to the virtual object.

2. The input interface system as set forth in claim 1, wherein:
the path inputting operation is a slash that is drawn so as to contact the virtual object.

3. The input interface system as set forth in claim 1, wherein:
the path inputting operation is text or a graphic, depending on the current location of the user.

4. The input interface system as set forth in claim 1, wherein:
the virtual object is an object that is moved relative to the background in a virtual space.

5. The input interface system as set forth in claim 1, wherein:
the virtual object is an object that is displayed superimposed on real map information.

6. The input interface system as set forth in claim 1, wherein:
in the event process that is performed through the path inputting operation, the form of a path that is inputted through the inputting operation, and/or an effect of a command that is executed depending on the path, will be different depending on location information of the user, a virtual proxy object that is associated with the user, and/or a form of linkage with another user.

7. A non-transitory medium containing a program configured to control an input interface system for a game wherein event processes that are generated accompanying user travel are executed sequentially, wherein the game is progressed in a virtual world based on points that are applied in correlation with travel distance of a user in a real world context, for causing a computer to function as:
- a virtual display data generating portion configured to generate a virtual object in accordance with the progress of the game that accompanies movement of the user;
- a compositing processing portion configured to display the virtual object so as to be superimposed on real map information;
- inputting means for receiving inputting of a user operation in respect to the virtual object that appears in the event processing and a selection operation in respect to a block that has a planar shape corresponding to geographic information of the real world context, and that partially or entirely covers the real map; and
- event execution processing means for progressing the game by defining the event process as having been executed when the user operation has been inputted correctly into the inputting means, wherein:
  - the virtual object includes a block that has a planar shape corresponding to geographic information of the real world context, and that partially or entirely covers the real map;
  - the block appears in an inactive state on the real map as a portion of movement trajectory in conjunction with the movement of the user in the real world context and virtual movement of a proxy object, and transitions to an active state based on athe selection operation of the user;
  - the user operation is a path inputting operation wherein a path is drawn on a touch screen; and
  - in the event execution processing means the event process is executed based on a shape of the path that is drawn in the path inputting operation, and a relative positioning with respect to the virtual object.

8. The non-transitory medium containing the program as set forth in claim 7, wherein:
the path inputting operation is a slash that is drawn so as to contact the virtual object.

9. The non-transitory medium containing the program as set forth in claim 7, wherein:
the path inputting operation is text or a graphic, depending on the current location of the user.

10. The non-transitory medium containing the program as set forth in claim 7, wherein:
the virtual object is an object that is moved relative to the background in a virtual space.

11. The non-transitory medium containing the program as set forth in claim 7, wherein:
the virtual object is an object that is displayed superimposed on real map information.

12. The non-transitory medium containing the program as set forth in claim 7, wherein:
in the event process that is performed through the path inputting operation, the form of a path that is inputted through the inputting operation, and/or an effect of a command that is executed depending on the path, will be different depending on location information of the user, a virtual proxy object that is associated with the user, and/or a form of linkage with another user.

13. A method for controlling an input interface system for a game wherein event processes that are generated accompanying user travel are executed sequentially, wherein the game is progressed in a virtual world based on points that are applied in correlation with travel distance of a user in a real world context, including:
- generating a virtual object in conjunction with advancement of the game that accompanies movement of the user, and displaying the virtual object superimposed on real map information;
- receiving an input of a user operation in respect to the virtual object and a selection operation with respect to block that has a planar shape corresponding to geographic information of the real world context, and that partially or entirely covers the real map that appears in the event processing; and
- progressing the game by defining the event process as having been executed when the user operation has been inputted correctly, wherein:
  - the virtual object includes the block;
  - the block appears in an inactive state on the real map as a portion of movement trajectory in conjunction with the movement of the user in the real world context and virtual movement of a proxy object, and transitions to an active state based on the a selection operation of the user;
  - the user operation is a path inputting operation wherein a path is drawn on a touch screen; and
  - the event process is executed based on a shape of the path that is drawn in the path inputting operation, and a relative positioning with respect to the virtual object.

14. The method as set forth in claim 13, wherein:
the path inputting operation is a slash that is drawn so as to contact the virtual object.

15. The method as set forth in claim 13, wherein:
the path inputting operation is text or a graphic, depending on the current location of the user.

16. The method as set forth in claim 13, wherein:
the virtual object is an object that is moved relative to the background in a virtual space.

17. The method as set forth in claim 13, wherein:
the virtual object is an object that is displayed superimposed on real map information.

18. The method as set forth in claim 13, wherein:
in the event process that is performed through the path inputting operation, the form of a path that is inputted through the inputting operation, and/or an effect of a command that is executed depending on the path, will be different depending on location information of the user, a virtual proxy object that is associated with the user, and/or a form of linkage with another user.

* * * * *